US012069574B2

(12) United States Patent
Wong et al.

(10) Patent No.: US 12,069,574 B2
(45) Date of Patent: Aug. 20, 2024

(54) COMMUNICATIONS DEVICES, INFRASTRUCTURE EQUIPMENT AND METHODS

(71) Applicant: Sony Group Corporation, Tokyo (JP)

(72) Inventors: Shin Horng Wong, Basingstoke (GB); Martin Warwick Beale, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 183 days.

(21) Appl. No.: 17/421,728

(22) PCT Filed: Dec. 23, 2019

(86) PCT No.: PCT/EP2019/086986
§ 371 (c)(1),
(2) Date: Jul. 9, 2021

(87) PCT Pub. No.: WO2020/144069
PCT Pub. Date: Jul. 16, 2020

(65) Prior Publication Data
US 2022/0086757 A1    Mar. 17, 2022

(30) Foreign Application Priority Data

Jan. 11, 2019    (EP) .................................... 19151487
Feb. 15, 2019    (EP) .................................... 19157544

(51) Int. Cl.
*H04W 52/02*    (2009.01)
(52) U.S. Cl.
CPC ... *H04W 52/0229* (2013.01); *H04W 52/0216* (2013.01); *H04W 52/028* (2013.01)
(58) Field of Classification Search
CPC ......... H04W 52/0229; H04W 52/0216; H04W 52/028; Y02D 30/70
See application file for complete search history.

(56) References Cited

U.S. PATENT DOCUMENTS

| 2014/0119255 | A1* | 5/2014 | Vannithamby .... | H04W 72/1215 370/311 |
| 2014/0301263 | A1* | 10/2014 | Ji ...................... | H04W 52/0212 370/311 |
| 2019/0098689 | A1* | 3/2019 | Wei ........................ | H04W 76/28 |

FOREIGN PATENT DOCUMENTS

| EP | 17169577 | 11/2018 |
| EP | 17186062 | 2/2019 |

(Continued)

OTHER PUBLICATIONS

International Search Report and Written Opinion mailed on Jun. 23, 2020, received for PCT Application PCT/EP2019/086986, Filed on Dec. 23, 2019, 13 pages.

(Continued)

*Primary Examiner* — Marcos L Torres
(74) *Attorney, Agent, or Firm* — XSENSUS LLP

(57) ABSTRACT

A communications device configured to receive signals from an infrastructure equipment of a wireless communications network is provided. The communications device is configured to periodically switch, in accordance with a first periodic rate, between a primary active operating mode and a primary reduced power operating mode in accordance with a primary discontinuous reception, DRX, operation. In some embodiments, the communications device is configured in combination with the receiver to monitor for signals transmitted by the infrastructure equipment to the communications device during the primary active operating mode, to switch off the receiver during the primary reduced power operating mode, and to start, during an instance of the primary active operating mode upon detection of a first downlink transmission from the infrastructure equipment to the communications device, an inactivity timer specifying an inactivity period during which the communications (Continued)

device does not switch into the primary reduced power operating mode.

19 Claims, 12 Drawing Sheets

(56) References Cited

FOREIGN PATENT DOCUMENTS

| EP | 17186065 | 2/2019 |
|---|---|---|
| EP | 17201751 | 5/2019 |
| EP | 3619987 | 3/2020 |
| EP | 3639573 | 4/2020 |
| EP | 3665882 | 6/2020 |
| EP | 3698590 | 8/2020 |
| WO | WO-2018/172382 A1 | 9/2018 |
| WO | WO-2018/228865 A1 | 12/2018 |
| WO | WO-2020/064945 A1 | 4/2020 |

OTHER PUBLICATIONS

Qualcomm Incorporated, "UE Power Saving During Active State", 3GPP TSG RAN WG2 NR #99bis, R2-1711904, Oct. 9-13, 2017, 8 pages.

Mediatek Inc., "Triggering Adaptation for UE Power Saving", 3GPP TSG RAN WG1 Meeting #95, R1-1812362, Nov. 12-16, 2018, 12 pages.

Qualcomm Incorporated, "UE Adaptation to the Traffic and UE Power Consumption Characteristics", 3GPP TSG-RAN WG1 Meeting #94bis, R1-1811282, Oct. 8-12, 2018, 17 pages.

Holma et al., "LTE for UMTS OFDMA and SC-FDMA Based Radio Access", John Wiley and Sons, 2009, pp. 25-27.

NTT DOCOMO Inc., "Revised WID on New Radio Access Technology", 3GPP TSG RAN Meeting #78, RP-172834, Dec. 18-21, 2017, 11 pages.

Sierra Wireless, "Idle Mode Power Efficiency Reduction", 3GPP TSG RAN WG1 Meeting #89, R1-1708311, May 15-19, 2017, 6 pages.

3GPP, "NR: Study on UE Power Saving (Release 16)", 3GPP TR 38.840 v0.1.0, Nov. 2018, pp. 1-24.

3GPP, "NR; Medium Access Control (MAC) Protocol Specification (Release 15)", 3GPP TS 38.321 V15.4.0, Dec. 2018, pp. 1-77.

Catt et al., "New SID: Study on UE Power Saving in NR", 3GPP TSG RAN Meetings #80, RP-181463, Jun. 11-14, 2018, 5 pages.

* cited by examiner

*IPPI signals 100% DRX_ON*

*IPPI signals 50% DRX_ON*

COMMUNICATIONS DEVICES, INFRASTRUCTURE EQUIPMENT AND METHODS

CROSS-REFERENCE TO RELATED APPLICATIONS

The present application is based on PCT filing PCT/EP2019/086986, filed Dec. 23, 2019, which claims priority to EP 19151487.6, filed Jan. 11, 2019 and EP 19157544.8, filed Feb. 15, 2019, the entire contents of each are incorporated herein by reference.

BACKGROUND

Field of Disclosure

The present disclosure relates generally to communications devices, infrastructure equipment and methods of operating communications devices and infrastructure equipment and specifically to communications devices configured to operate in accordance with a discontinuous reception (DRX) operation.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Some embodiments of the present technique can provide a communications device configured to receive signals from an infrastructure equipment of a wireless communications network. The communications device is configured to switch at a first periodic rate between a primary active operating mode and a primary reduced power operating mode in accordance with a primary discontinuous reception, DRX, operation. The communications device comprises a receiver configured to receive signals via a wireless access interface provided by the wireless communications network, and a controller configured in combination with the receiver to monitor for signals transmitted by the infrastructure equipment to the communications device during the primary active operating mode, to reduce an operating power of the receiver during the primary reduced power operating mode, and to start, during an instance of the primary active operating mode upon detection of a first downlink transmission from the infrastructure equipment to the communications device, an inactivity timer specifying an inactivity period during which the communications device does not switch into the primary reduced power operating mode. The communications device is configured, during the inactivity period, to operate in a power consumption optimised mode.

Other embodiments of the present technique can provide a communications device configured to receive signals from an infrastructure equipment of a wireless communications network. The communications device is configured to switch at a first periodic rate between a primary active operating mode and a primary reduced power operating mode in accordance with a primary discontinuous reception, DRX, operation. The communications device comprises a receiver configured to receive signals via a wireless access interface provided by the wireless communications network, and a controller configured in combination with the receiver to monitor for signals transmitted by the infrastructure equipment to the communications device during the primary active operating mode, to reduce an operating power of the receiver during the primary reduced power operating mode, to determine that the communications device should switch from the primary DRX operation to operate in accordance with a short DRX operation in which the communications device is configured to switch at least at a second periodic rate between a secondary active operating mode and a secondary reduced power operating mode, and to start, subsequent to determining that the communications device should operate in accordance with the short DRX operation, a short DRX duration timer specifying a short DRX period during which the communications device operates in accordance with the short DRX operation before switching back to the primary DRX operation. At least one parameter of the short DRX operation is different to the at least one parameter of the primary DRX operation.

Embodiments of the present technique, which further relate to infrastructure equipment, methods of operating communications devices and infrastructure equipment, and circuitry for communications devices and infrastructure equipment, allow for the reduction of battery power consumption during the inactivity period or during short DRX cycles, in which the UE will remain awake and continue to monitor for downlink signals.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
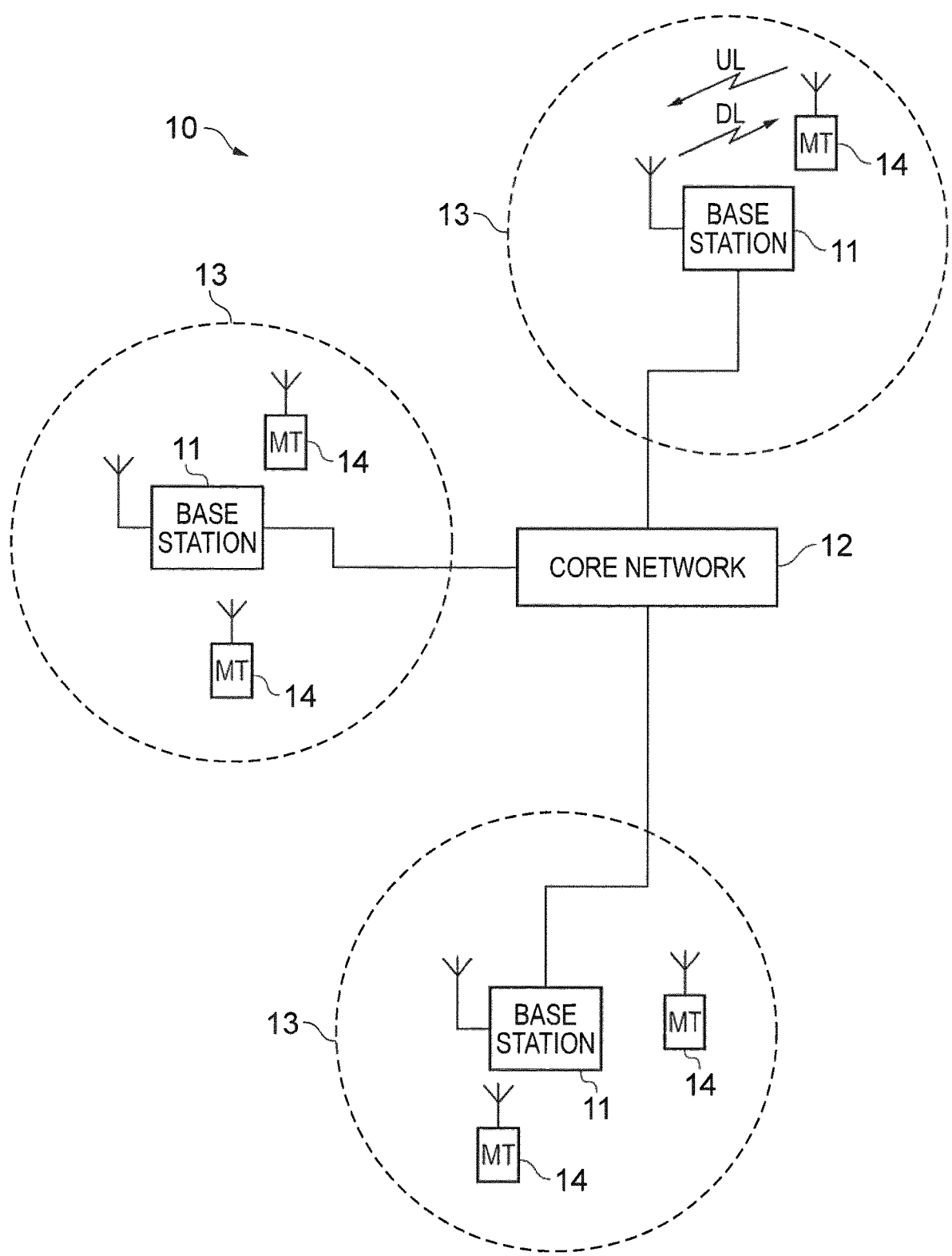
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present disclosure can also find application with advanced wireless communications systems such as those referred to as 5G or New Radio (NR) Access Technology. The use cases that are considered for NR include:

Enhanced Mobile Broadband (eMBB)
Massive Machine Type Communications (mMTC)
Ultra Reliable & Low Latency Communications (URLLC) [2]

eMBB services are characterised by high capacity with a requirement to support up to 20 Gb/s. The requirement for URLLC is a reliability of $1-10^{-5}$ (99.999%) for one transmission of a relatively short packet such as 32 bytes with a user plane latency of 1 ms.

The elements of the wireless access network shown in FIG. 1 may be equally applied to a 5G new RAT configuration, except that a change in terminology may be applied as mentioned above.

Figure 2:
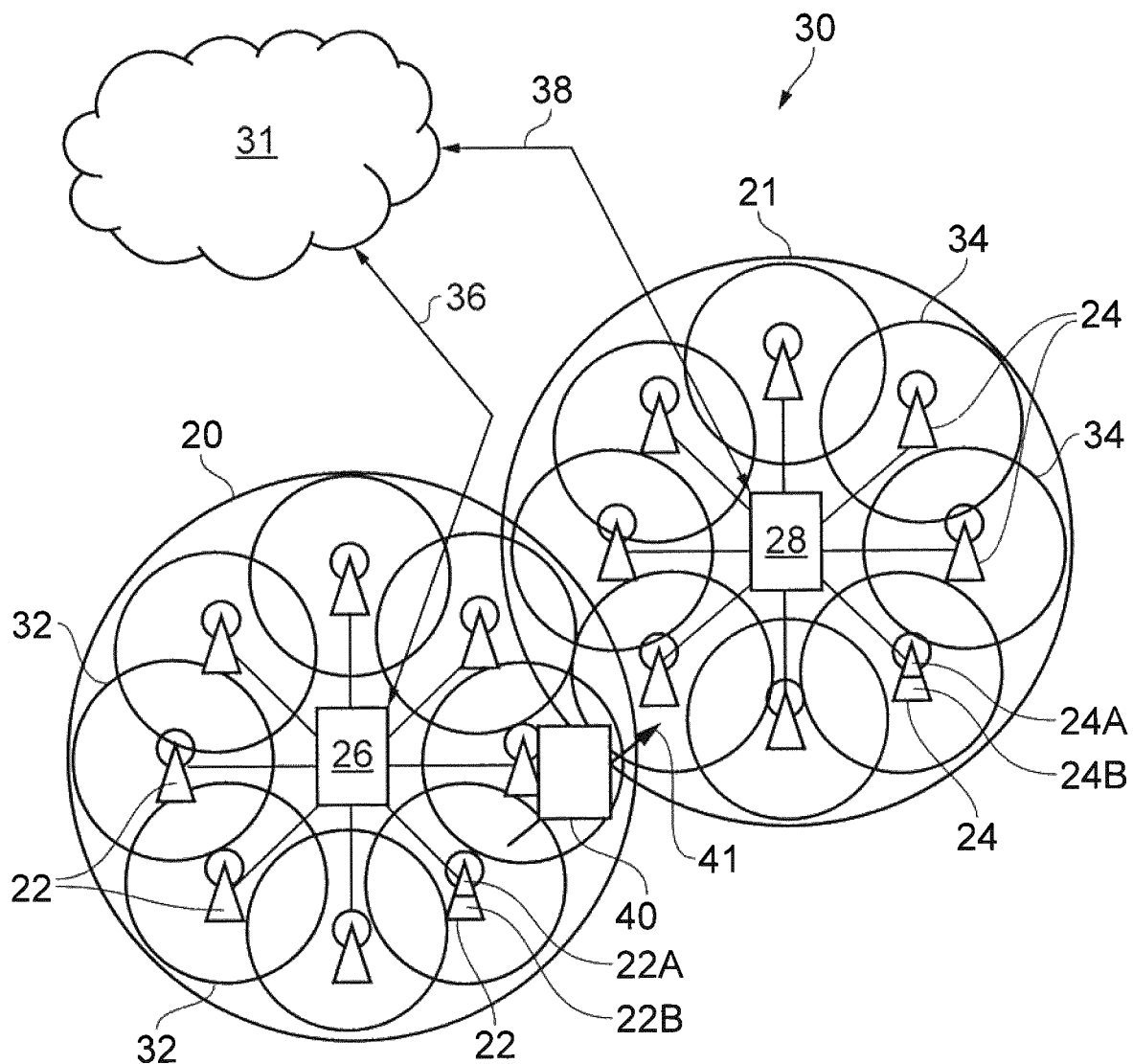
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit, CU) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units (DUs) 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (DU/TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

As is well understood, various wireless telecommunications networks, such as the LTE-based network represented in FIG. 1 and the NR-based network represented in FIG. 2, may support different Radio Resource Control (RRC) modes for terminal devices, typically including: (i) RRC idle mode (RRC_IDLE); and (ii) RRC connected mode (RRC_CONNECTED). When a terminal device transmits data, RRC connected mode is generally used. The RRC idle mode, on the other hand, is for terminal devices which are registered to the network (EMM-REGISTERED), but not currently in active communication (ECM-IDLE). Thus, generally speaking, in RRC connected mode a terminal device is connected to a radio network access node (e.g. an LTE base station) in the sense of being able to exchange user plane data with the radio network access node. Conversely, in RRC idle mode a terminal device is not connected to a radio network access node in the sense of not being able to communicate user plane data using the radio network access node. In idle mode the terminal device may still receive some communications from base stations, for example reference signalling for cell reselection purposes and other broadcast signalling. The RRC connection setup procedure of going from RRC idle mode to RRC connected mode may be referred to as connecting to a cell/base station.

For a terminal device in RRC idle mode the core network is aware that the terminal device is present within the network, but the radio access network (RAN) part (comprising radio network infrastructure equipment such as the base stations 11 of FIG. 1 and/or the combined TRPs/CUs of FIG. 2) is not. The core network is aware of the location of idle mode terminal devices at a paging tracking area level but not at the level of individual transceiver entities. The core network will generally assume a terminal device is located within the tracking area(s) associated with a transceiver entity most recently used for communicating with the terminal device, unless the terminal device has since provided a specific tracking area update (TAU) to the network. (As is conventional, idle mode terminal devices are typically required to send a TAU when they detect they have entered a different tracking area to allow the core network to keep track of their location.) Because the core network tracks terminal devices at a tracking area level, it is generally not possible for the network infrastructure to know which specific transceiver entities (radio network node) to use when seeking to initiate contact with a terminal device in idle mode. Consequently, and as is well known, when a core network is required to connect to an idle mode terminal device a paging procedure is used.

In a typical currently deployed network, idle mode terminal devices are configured to monitor for paging messages periodically. For terminal devices (in connected and idle mode) operating in a discontinuous reception (DRX) mode this occurs when they wake up for their DRX wake time. Paging signals for a specific terminal device are transmitted in defined frames (Paging Frames)/sub-frames (Paging Occasions) which for a given terminal device may be derived from the International Mobile Subscriber Identifier (IMSI) of the terminal device, as well as paging related DRX parameters established in system information transmitted within the network.

Power saving is an important aspect of NR, and there are a number of different ways in which the battery life of a UE may be improved. One such way is by enabling the DRX configuration to adapt to the UE's traffic, which may involve, for example, the use of a Wake Up Signal (WUS) to indicate whether a UE should wake up during a DRX ON period. The WUS is a signal that is transmitted to a UE or a group of UEs prior to a DRX ON period or Paging Occasion to indicate whether the UE(s) needs to wake up during this ON period and monitor for possible traffic, e.g. monitor the PDCCH. This recognises that not every DRX ON period contains traffic for the UE, and for such a case, the PDCCH monitoring consumes unnecessary power from the UE, which can be avoided with this WUS signal. Co-pending European patent applications filed with application numbers EP17169577.8 [3], EP17186065.3 [4], EP17186062.0 [5], and EP17201751.9 [6] address the use of WUS signals.

If the WUS is misdetected (i.e. a WUS is transmitted but the UE fails to detect it), then the UE would miss the corresponding paging message, and so the reliability of the paging is reduced. To avoid misdetection, another Power Saving Signal is proposed, where this signal is always transmitted prior to a paging occasion (PO) and would indicate to the UE whether it should Go To Sleep (i.e. there is no need for the UE to monitor for MPDCCH and PDSCH) or Wake Up (i.e. monitor for MPDCCH and PDSCH in the corresponding PO). This Go to sleep or wake Up Signal (GUS), which is known and proposed in [7], would therefore remove any misdetection since the UE would expect it to be there. The UE will miss a paging occasion if there is an incorrect detection at the UE; i.e. the UE mistakes a Wake Up for a Go To Sleep (GTS) indication. The drawback of using GUS is that it consumes a lot of resources, since it needs to be transmitted regardless of whether there is any potential paging message for the UE.

Figure 3:
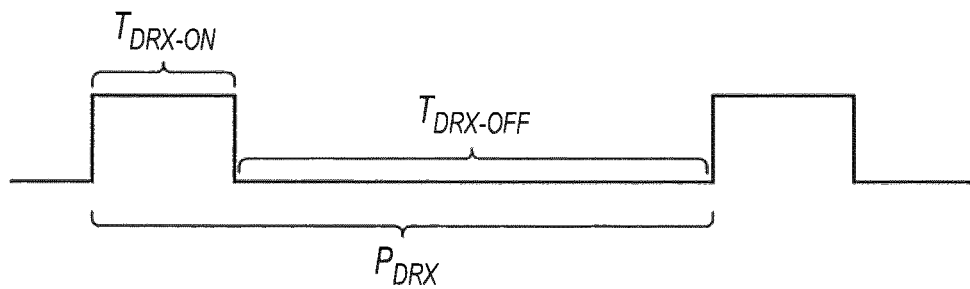
FIG. 3 shows an example of a discontinuous reception (DRX) cycle.

The basic DRX cycle is shown in FIG. 3, which consists of a DRX ON period of duration $T_{DRX-ON}$ and a DRX OFF period of duration $T_{DRX-OFF}$ where the DRX ON period occurs periodically at a fixed DRX period, $P_{DRX}$. During the DRX ON period, the UE switches on its receiver to monitor for downlink traffic and switches off its receiver during the DRX OFF period to save battery. The DRX parameters $T_{DRX-ON}$ & $P_{DRX}$ are configured by the network. It should be appreciated by those skilled in the art that such a basic operation may not always be efficient, particularly if a UE frequently does not receive any signals during the ON period (or active operating mode) of the DRX operation.

Figure 4:
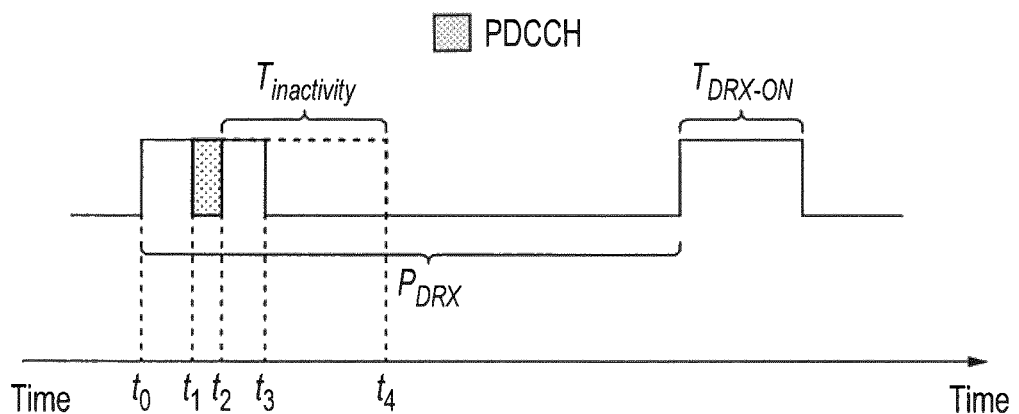
FIG. 4 shows an example of how an inactivity timer may be used during DRX.

If a PDCCH is detected for the UE during the DRX ON period, the UE starts an inactivity timer $T_{Inactivity}$ specifying a period in which the UE will remain awake (i.e. receiver is active) and continues to monitor for further downlink traffic, notably PDCCH. When the inactivity timer expires, the UE moves to the DRX OFF state. An example is shown in FIG. 4, where a PDCCH is detected at the at time $t_1$ of a DRX ON period, which triggers the inactivity timer which starts at $t_2$ for a duration of $T_{Inactivity}$. When the timer expires at time $t_4$, the UE switches off its receiver. The inactivity period can extend beyond the DRX ON period; that is, the UE continues to stay awake after the DRX ON period as shown in FIG. 4 where the DRX ON ends at time $t_3$ and the inactivity period continues until time $t_4$. The rationale here is that if the UE receives a data packet, then it is likely it may receive another data packet in the near future and so if the UE receives a data packet towards the end of its DRX ON period, the inactivity timer will keep the UE awake to receive potential further data packets. If the UE receives a packet during the inactivity period, the inactivity timer will reset, i.e. the UE would extend its wake up duration due to the possibility of receiving yet further data packets.

Figure 5:
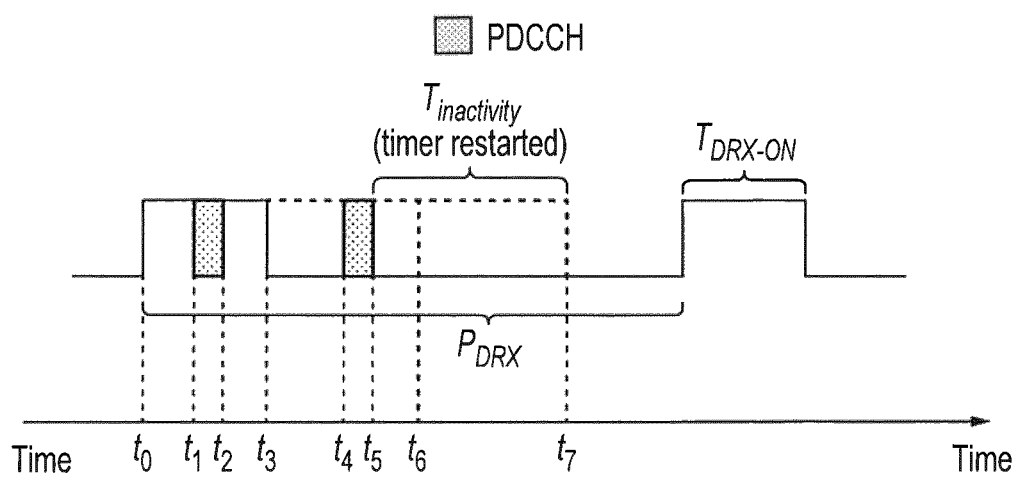
FIG. 5 shows an example of how an inactivity timer may be restarted when a further physical downlink control channel (PDCCH) is detected before the previous inactivity timer expires.

If during the inactivity period, the UE receives a further PDCCH, the inactivity timer is reset, i.e. restarted. An example is shown in FIG. 5, where during a DRX ON period (between time $t_0$ and $t_3$), a PDCCH is detected by the UE at time $t_1$ and so the inactivity timer starts after the PDCCH at time $t_2$ which expires at time $t_6$. During this first inactivity period, another PDCCH is detected at time $t_4$ which then resets the inactivity timer, i.e. the inactivity timer restarts after this PDCCH at time $t_5$ with a duration of $T_{inactivity}$. This follows the same rationale above; that if a data packet is transmitted for a UE then it is likely that another data packet would be transmitted for the same UE in the near future.

The inactivity timer is configured via RRC signalling by the network and can range from 0 ms to 2560 ms. In [8], some DRX parameters and $T_{inactivity}$ values are proposed for evaluation, which represent likely network configurations. Example values in [8] include 10 ms $T_{DRX\_ON}$ with 200 ms $T_{inactivity}$, 8 ms $T_{DRX-ON}$ with 100 ms $T_{inactivity}$. It is observed that the inactivity period is typically significantly longer than the DRX ON duration, which would also consume significant battery power. Recognising these issues, some embodiments of the present disclosure introduce schemes to reduce battery power consumption during the inactivity period.

Short DRX Operation

Both NR and LTE support a short DRX mode of operation. The short DRX cycle may be optionally implemented within a long DRX (i.e. standard) cycle and follows the period where the inactivity timer is running. It is controlled by the following parameters:
drx-ShortCycle (optional): the Short DRX cycle; and
drx-ShortCycleTimer (optional): the duration the UE shall follow the Short DRX cycle.

Figure 6:
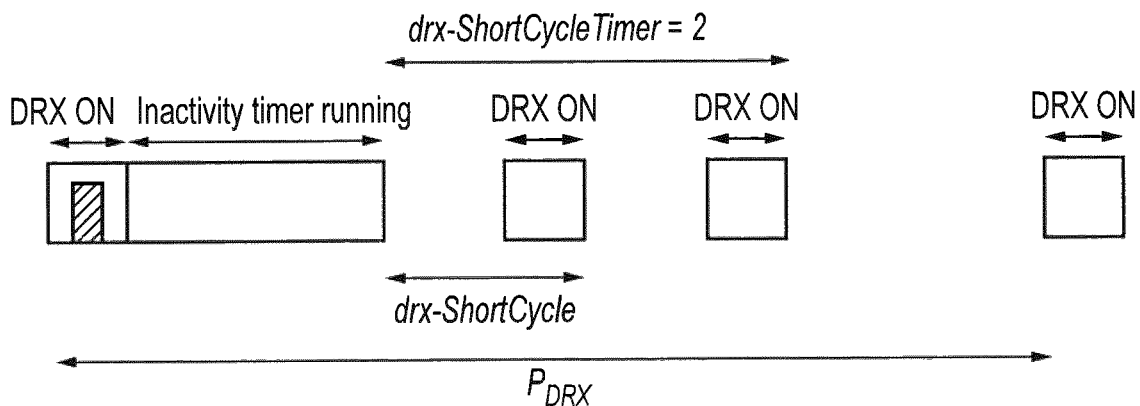
FIG. 6 shows a first example of a short DRX operation.

Operation of short DRX is described in the 3GPP Technical Specification 38.321 [9], in section 5.7. Some of the text herein describing the short DRX operation is reproduced and adapted from [9]. The principle of operation of "short DRX" is that PDCCH is monitored according to a DRX cycle once the inactivity period has expired. This is illustrated in FIG. 6 which shows the following aspects of short DRX operation:
If there has been activity in the initial DRX_ON period (as shown with the hashed box), the inactivity timer is started;
If there is no activity (no PDCCH received) during the running of the inactivity timer, the system enters into short DRX operation;
Short DRX has periods where the UE monitors PDCCH and periods where it doesn't. As can be seen, in the example of FIG. 6, the UE starts short DRX by not monitoring PDCCH;
Every drx-ShortCycle number of subframes, the UE monitors PDCCH for DRX_ON number of subframes. For example, if drx-ShortCycle=16 and DRX_ON=4, the UE monitors PDCCH for 4 subframes out of every 16. The subframes that the UE monitors for PDCCH are known to both the UE and the network;
The UE performs drx-ShortCycleTimer number of short DRX cycles. As can be seen, in the example of FIG. 6, drx-ShortCycleTimer=2;
If there is no activity during the short DRX operation, the UE goes to sleep and wakes up to monitor PDCCH after the end of the long DRX cycle (i.e. after $P_{DRX}$ subframes).

Figure 7:
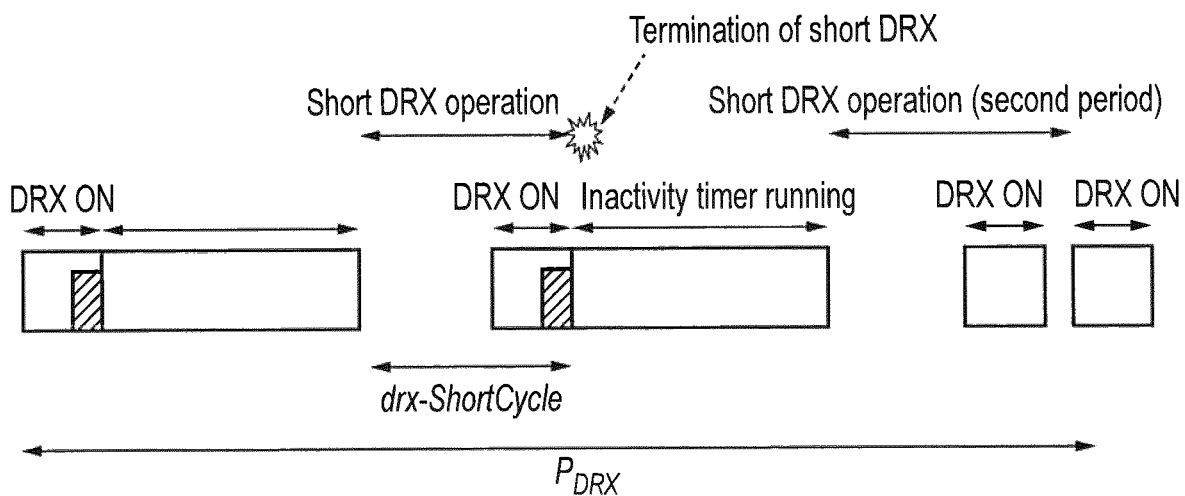
FIG. 7 shows a second example of a short DRX operation where an inactivity timer may be restarted during the initial short DRX operation.

If the UE decodes a PDCCH during one of the DRX_ON durations of the short DRX phase, the UE restarts its inactivity timer (and can then enter a second period of short DRX if there was no PDCCH activity during this second running of the inactivity timer). This operation is shown in FIG. 7. The duration of the inactivity timer and the parameters controlling short-DRX operation are configurable. At the extremes, the network can configure:
Inactivity timer=0: in this case, the UE transitions directly from DRX_ON to short-DRX;
Short-DRX not configured (as described above, short DRX is an optional feature): in this case, following expiry of the inactivity timer, the UE goes into sleep mode until the end of the period $P_{DRX}$ (i.e. until the end of the long DRX cycle).

DRX Phases in Inactivity Period and/or in Short DRX Operation

Figure 8:
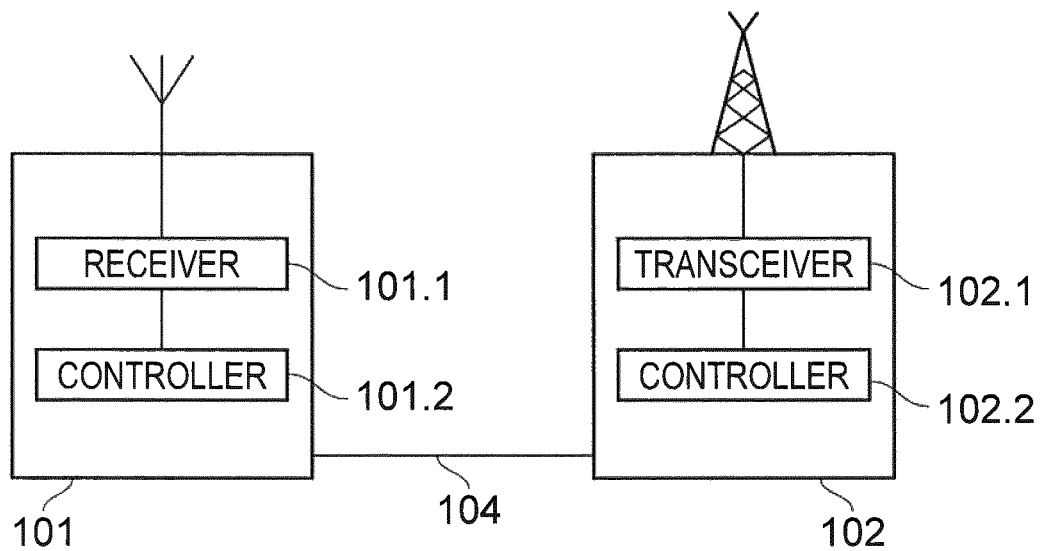
FIG. 8 shows a schematic representation of a wireless communications network comprising a communications device and an infrastructure equipment in accordance with embodiments of the present technique.

FIG. 8 shows a schematic representation of a wireless communications system comprising a communications device 101 and an infrastructure equipment 102 in accordance with some embodiments of the present technique. The communications device 101 and the infrastructure equipment 102 each comprise a controller (or controller circuitry) 101.2, 102.2, which may be, for example, a microprocessor(s), a CPU(s), a chip(s), or a dedicated chipset(s), etc.

The communications device 101 comprises a receiver (or receiver circuitry) 101.1 configured to receive signals via a wireless access interface 104 provided by the wireless communications network. It should be appreciated by those skilled in the art that this may be a standalone receiver, or may form part of a transceiver (or transceiver circuitry) capable of transmitting and receiving signals. The communications device 101 may also comprise a separate transmitter. Similarly, the infrastructure equipment 102 may comprise a transceiver (or transceiver circuitry) 102.1, which is configured to transmit or receive signals via the wireless access interface 104. This transceiver 102.1 may equally be formed of separate transmitter and receiver elements or circuitry.

In some embodiments of the present technique (termed herein the "inactivity period embodiments/arrangements" and meaning any embodiments directed towards a communications device configured to operate in a power consumption optimised mode during an inactivity period), the receiver circuitry 101.1 and the controller circuitry 101.2 of the communications device 101 are configured in combination to monitor for signals transmitted by the infrastructure equipment 102 to the communications device 101 during the primary active operating mode, to switch off the receiver during the primary reduced power operating mode, and to start, during an instance of the primary active operating mode upon detection of a first downlink transmission from the infrastructure equipment 102 to the communications device 101, an inactivity timer specifying an inactivity period during which the communications device 101 does not switch into the primary reduced power operating mode. The communications device 101 is configured, during the inactivity period, to operate in a power consumption optimised mode.

Here, in some inactivity period embodiments of the present technique, the communications device is configured, in the power consumption optimised mode, to operate with a reduced bandwidth compared to a bandwidth with which the communications device operates when not in the power consumption optimised mode. Here, a smaller bandwidth part would be used for transmissions to the UE, which would therefore be required to decode a narrower bandwidth, which requires less power consumption.

Alternatively, or in addition, in some inactivity period embodiments of the present technique, the communications device is configured, in the power consumption optimised mode, to monitor fewer beams compared to a number of beams that the communications device is configured to monitor when not in the power consumption optimised mode. Those skilled in the art would be well aware that, according to some radio access technologies, including the NR radio access technologies under development by 3GPP, a cell may be formed (or, in other words, 'generated') by a plurality of directional beams Each beam may be characterised by a variance in gain with respect to a direction from the antenna; a beam may be considered 'wide', where the gain is consistently relatively high over a broad range of directions, or 'narrow', where relatively high gain is only achieved over a narrow range of directions. Depending on the direction of the communications device with respect to the infrastructure equipment, the gain of a particular beam may be sufficiently high (and the resulting coupling loss sufficiently low) to permit communications between the communications device and the infrastructure equipment via the beam. Beams may be formed for transmitting or receiving at the infrastructure equipment using phased antenna arrays, directional antennas, a combination of both, or other known techniques. Generally, a beam is named as a Transmission Configuration Indication (TCI) state in NR. The higher the number of beams with which signals may be transmitted to the UE, the better the signal quality is likely to be, though power consumption increases with each additional beam the UE is required to monitor. Hence, monitoring fewer beams when in the power consumption optimised mode allows the communications device to save power.

Alternatively, or in addition, in some inactivity period embodiments of the present technique, the communications device is configured, in the power consumption optimised mode, to monitor fewer transmit antenna ports compared to a number of transmit antenna ports that the communications device is configured to monitor when not in the power consumption optimised mode. Here, fewer transmission ports are used and thus need to be channel estimated by the UE, which although it reduces antenna diversity, saves power at the UE.

Alternatively, or in addition, in some inactivity period embodiments of the present technique, the communications device is configured, in the power consumption optimised mode, to perform cross-slot scheduling. When cross-slot scheduling is performed, a data assignment carried by a control channel may refer to the next or a later TTI to the TTI in which the downlink assignment is itself sent. A UE is able to save power through such scheduling as it can power down its receiver once the control information has been received (as it knows it will not receive the data right away) and also the control channel itself may be transmitted over a reduced bandwidth.

Figure 9:
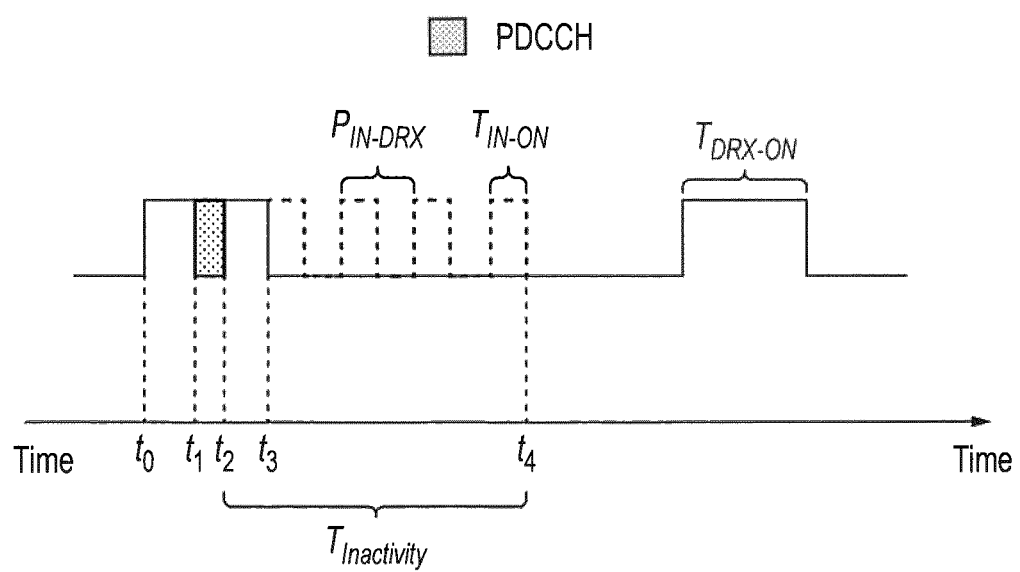
FIG. 9 shows an example of DRX during the inactivity period in accordance with embodiments of the present technique.

Alternatively or in addition to the above, in some inactivity period embodiments of the present technique, the communications device is configured, when in the power consumption optimised mode, to periodically switch, in accordance with at least a second periodic rate, between a secondary active operating mode and a secondary reduced power operating mode in accordance with a secondary DRX operation during the inactivity period, the second periodic rate being higher than the first periodic rate. Essentially, some inactivity period embodiments of the present technique (i.e. those which relate to the secondary DRX operation) introduce a non-contiguous inactivity period. That is, the UE performs DRX during the inactivity period. An example is shown in FIG. 9, where during a DRX ON period between time $t_0$ and $t_3$, the UE detected a PDCCH and starts the inactivity timer. However, instead of having the receiver switched on for the entire duration of the inactivity period, a DRX with a DRX ON period of $T_{IN-ON}$ and a DRX periodicity of $P_{IN-DRX}$ is used. It can therefore be appreciated that performing a DRX during the inactivity period would significantly reduce the power consumption of the UE, whilst allowing the UE the opportunity to receive data. Another interpretation is that the UE is in a state of a reduced rate of PDCCH monitoring during the inactivity period. That is, instead of monitoring every slot for PDCCH during the inactivity period, the UE only monitors for PDCCH during the $T_{IN-ON}$ period. When the UE is not monitoring for PDCCH, it can switched to a reduced power operating mode. It should be appreciated that the following inactivity period embodiments are also applicable in this alternate interpretation of the new characteristic of the inactivity period (i.e. reduced rate of PDCCH monitoring).

In other embodiments of the present technique (termed herein the "short DRX embodiments/arrangements" and meaning any embodiments directed towards a communications device configured to operate in accordance with a short DRX operating mode during a short DRX period), the receiver circuitry 101.1 and the controller circuitry 101.2 of the communications device 101 are configured in combination to monitor for signals transmitted by the infrastructure equipment 102 to the communications device 101 during the primary active operating mode, to reduce an operating power of the receiver circuitry (101.1) during the primary reduced power operating mode, to determine that the communications device 101 should switch from the primary DRX operation to operate in accordance with a short DRX operation in which the communications device 101 is configured to switch at least at a second periodic rate between a secondary active operating mode and a secondary reduced power operating mode (those skilled in the art would appreciate that this may, for example, be in response to receiving a downlink transmission/PDCCH in the same manner as the above described inactivity period embodiments, or in response to an inactivity period as described herein expiring, where the UE moves into the short DRX operation before returning to the primary DRX operation), and to start, subsequent to determining that the communications device 101 should operate in accordance with the short DRX operation, a short DRX duration timer specifying a short DRX period during which the communications device 101 operates in accordance with the short DRX operation before switching back to the primary DRX operation. At least one parameter of the short DRX operation is different to the at least one parameter of the primary DRX operation. As in the inactivity period embodiments described above, the communications device may also be configured to switch off the receiver during the primary reduced power operating mode.

As described above, those skilled in the art would appreciate that the communications device may determine that the it should switch from the primary DRX operation to operate in accordance with the short DRX operation in a number of ways, which include but are not limited to making the determination upon detection of a downlink transmission from the infrastructure equipment to the communications device or upon detection that an inactivity period defined by an inactivity timer started by the communications device during the primary DRX operation has elapsed.

Here, in some arrangements of the short DRX embodiments, the at least one parameter of the short DRX operation is a time duration of each instance of the secondary active operating mode and the at least one parameter of the long DRX operation is a time duration of each instance of the primary active operating mode. Alternatively, or in addition, the at least one parameter of the short DRX operation is an inactivity timer started during the short DRX operation and defining a period during which the communications device remains in the secondary active operating mode following the short DRX operation and the at least one parameter of the primary DRX operation is an inactivity timer started during the primary DRX operation and defining a period during which the communications device remains in the primary active operating mode following the primary DRX operation (for example, if the UE receives a PDCCH during DRX_ON in the short DRX period, the UE starts an inactivity timer (and the UE receiver is ON)—this inactivity timer in the short DRX operation may be shorter than for the long DRX inactivity timer, e.g. for long DRX, the inactivity timer may define a period of 100 ms; for short DRX, the inactivity timer may define a period of 20 ms, and thus if the UE does become active again during short DRX, it doesn't become active for very long, hence saving power). Alternatively, or in addition, the at least one parameter of the short DRX operation is a number of instances of the secondary active operating mode during the short DRX operation and the at least one parameter of the long DRX operation is a number of instances of the primary active operating mode during the primary DRX operation. Alternatively, or in addition, the at least one parameter of the short DRX operation is a proportion of the short DRX operation during which the communications device is in the secondary active operating mode, and the at least one parameter of the long DRX operation is a proportion of the primary DRX operation during which the communications device is in the primary active operating mode. Alternatively, or in addition, the at least one parameter of the short DRX operation is the second periodic rate, and the at least one parameter of the primary DRX cycle is the first periodic rate.

Essentially, the short DRX embodiments of the present technique provide solutions in that the parameters applied during the short DRX period can be different to those of the long (i.e. primary) DRX mode of operation. For example, as described above, the DRX_ON period may be different during operation of short DRX to the main DRX_ON period. E.g. the main DRX_ON period may be 8 subframes, but during operation of short DRX, the DRX_ON period may be 4 subframes. This functionality, which can save power at the UE during the short DRX period, can be implemented through a new short DRX parameter:

drx-onShortDurationTimer: the duration during which operation of short DRX takes place.

In an arrangement of inactivity period embodiments of the present technique, for any portion of an inactivity period that falls within a DRX ON period, the UE receiver is fully switched on. That is, no DRX is applied on the inactivity period when the UE is still within the DRX ON period. In other words, the communications device is configured to remain in the primary active operating mode after starting the inactivity timer until the end of the instance of the primary active operating mode in which the inactivity timer was started. An example is shown in FIG. 9; when the inactivity period starts at time $t_2$, the receiver is fully switched on until time $t_3$ (the end of that DRX ON period) before it moves to DRX mode (i.e. between time $t_3$ and $t_4$). This arrangement recognises that the UE is technically in a DRX ON period during the time between $t_2$ and $t_3$ and hence it makes sense for the UE to have its receiver fully turned on. Although the example in FIG. 9 shows that the UE moves to a DRX mode immediately after the DRX ON period at time $t_3$, it should be appreciated that this arrangement is not restricted to this case and the DRX mode can start after the DRX ON period, e.g. after a time offset from the end of the DRX ON period.

Figure 10:
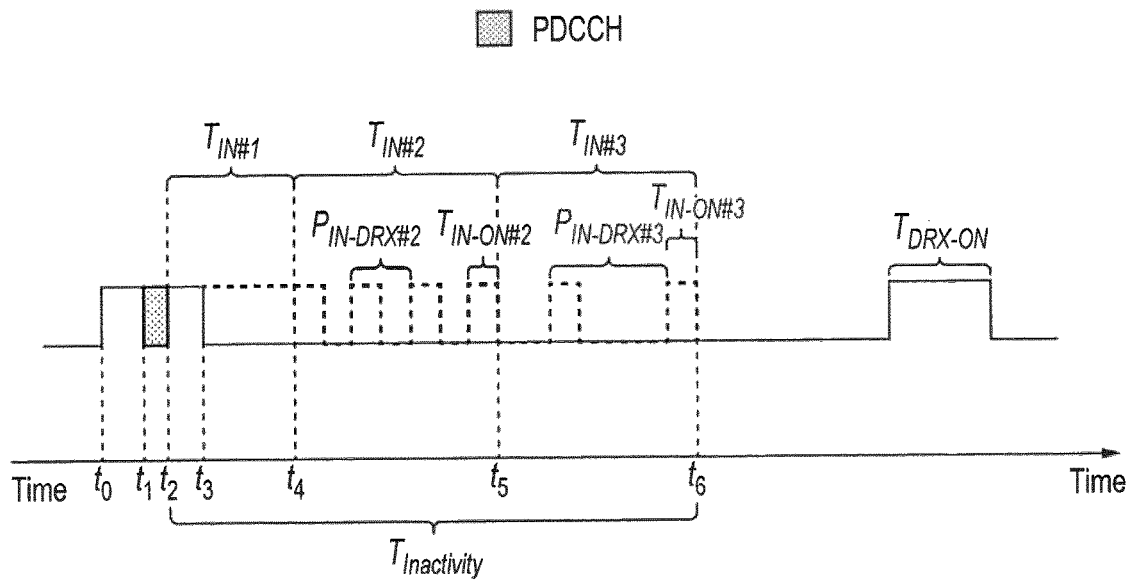
FIG. 10 shows an example of how the DRX ON rate may be gradually reduced during the inactivity period in accordance with embodiments of the present technique.

In another arrangement of inactivity period embodiments of the present technique, the inactivity period consists of multiple phases where each phase uses a different set of DRX parameters. In other words, the secondary DRX operation comprises a plurality of phases, each of the phases having a different value of at least one DRX parameter. Each phase lasts for a known duration, e.g. $\{T_{IN\ \#1}, T_{IN\ \#2}, T_{IN\ \#3},$ etc.). An example is shown in FIG. 10, where a PDCCH is detected during a DRX ON period between time $t_0$ and $t_3$, which triggers the inactivity period of duration $T_{Inactivity}$. The inactivity period starts with the $1^{st}$ phase without any DRX (i.e. DRX ON rate is 100%) at time $t_2$ for $T_{IN\ \#1}$. This is followed by a $2^{nd}$ phase at time $t_4$ for duration $T_{IN\ \#2}$, which consists of a DRX cycle with period $P_{IN-DRX\ \#2}$ and DRX ON duration of $T_{IN-ON\ \#2}$ where here, the UE receiver is on 50% of the time (i.e. DRX ON rate of 50%). In the $3^{rd}$ phase the DRX cycle has a period $P_{IN-DRX\ \#3}$ and DRX ON duration of $T_{IN-ON\ \#3}$ where here the DRX ON rate is reduced to 25%, at time $t_5$ for $T_{IN\ \#3}$ until the inactivity period expires at time $t_6$. Although the DRX ON rate is reduced by half with every subsequent phase in this example (assuming that the likelihood of data traffic reduces as the length of time without traffic activity increases), it should be appreciated that this arrangement is not restricted to these DRX ON rates and other rates can be used.

This at least one DRX parameter may comprise a proportion of the secondary DRX operation during which the communications device is in the secondary active operating mode. Alternatively, or in addition, this at least one DRX parameter may comprise a time duration that the communications device is in each instance of the second active operating mode during the secondary DRX operation. Alternatively, or in addition, this at least one DRX parameter may comprise a periodic rate of switching between the secondary active operating mode and the secondary reduced power operating mode during the secondary DRX operation.

While the description of there being different phases during the power consumption optimised mode has focused on applying phases to a secondary DRX operation during the power consumption optimised mode, it will be appreciated that different phases can be applied to other power consumption optimisation techniques in a similar manner during the power consumption optimised mode. For example, when the bandwidth is reduced during the power consumption optimised mode, during a first phase, the power consumption optimised mode can operate with a bandwidth that is less than during the primary active operating mode, and during a second phase the power consumption optimised mode can operate with a bandwidth that is less than during the first phase of the power consumption optimised mode. In further examples:

The number of beams to monitor can change between phases of the power consumption optimised mode;

The number of antenna ports to monitor can change between phases of the power consumption optimised mode; or The number of slots between allocation and reception (e.g. between PDCCH and PDSCH) can change between phases of the power consumption optimised mode.

Furthermore, power consumption optimisation techniques can be applied in different combinations during different phases of the power consumption optimised mode. For example, during a first phase, a secondary DRX operation can be performed, during a second phase, a secondary DRX operation can be performed with a reduced bandwidth compared to the first phase. In other words, the power consumption optimised mode comprises a plurality of phases, each of the phases having a different value of at least one parameter.

The above described inactivity period embodiment relating to the inactivity period comprising a number of phases is applicable to some embodiments of the short-DRX case: the DRX parameters applied during some cycles of the short DRX operation may be different to the DRX parameters applied during other cycles of the short DRX operation. For example, the DRX_ON duration of the short DRX cycle can vary from one short DRX cycle to another. In another example, the drx-ShortCycle length can vary from one short DRX cycle to another (e.g. a first short DRX cycle has a length of 16 subframes whereas a later short DRX cycle has a length of 64 subframes). In other words, the short DRX operation comprises a plurality of phases, each of the phases having a different value of at least one short DRX parameter.

Here, the at least one short DRX parameter comprises a proportion of the short DRX operation during which the communications device is in the secondary active operating mode. Alternatively, or in addition, the at least one short DRX parameter comprises a time duration that the communications device is in each instance of the secondary active operating mode during the short DRX operation. Alternatively, or in addition, the at least one short DRX parameter comprises a periodic rate of switching of the communications device between the secondary active operating mode and the secondary reduced power operating mode. Alternatively, or in addition, the at least one short DRX parameter comprises a number of instances of the secondary active operating mode. It should be appreciated by those skilled in the art that these, and any other, examples of short DRX parameters may be applied to any of the below described or claimed short DRX embodiments where a short DRX parameter is mentioned but not elaborated upon.

Figure 11:
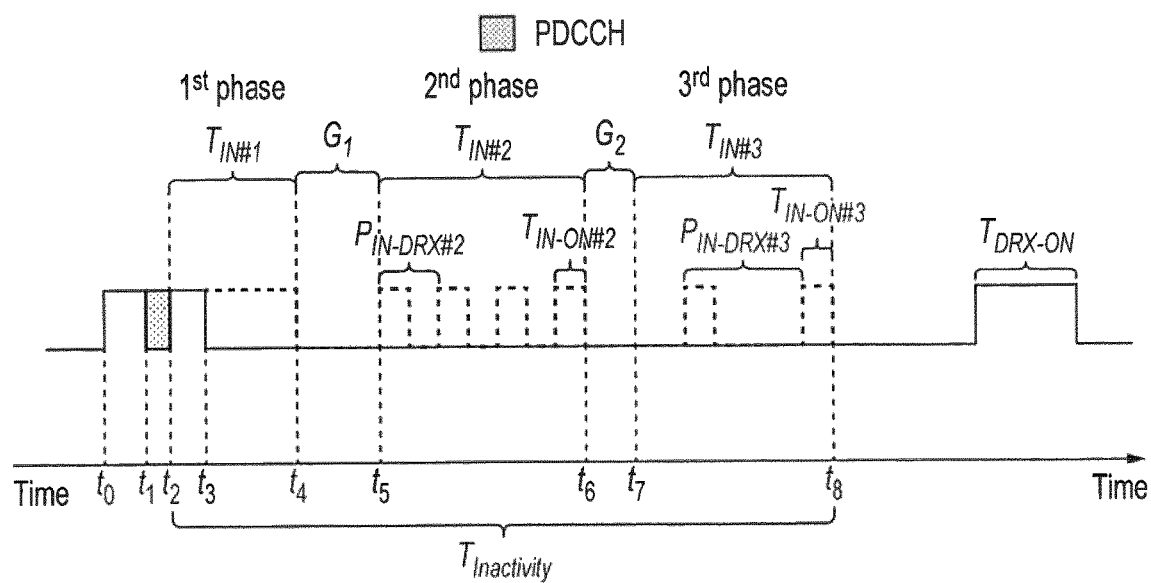
FIG. 11 illustrates an example of time gaps between two phases of an inactivity period in accordance with embodiments of the present technique.

In another arrangement of inactivity period embodiments of the present technique, a time gap is introduced between two phases within the inactivity period. That is, a time gap (or a delay) between two different DRX ON rates of an inactivity period, where during this time gap the UE receiver is switched off. In other words, there is a time gap between two of the plurality of phases of the secondary DRX operation during which the communications device is in the secondary reduced power operating mode. An example is shown in FIG. 11, where the inactivity period spanning time $t_2$ to time $t_8$ of duration $T_{Inactivity}$ has 3 phases. These $1^{st}$, $2^{nd}$ and $3^{rd}$ phases have duration $T_{IN\ \#1}$, $T_{IN\ \#2}$ and $T_{IN\ \#3}$ respectively where the DRX ON rate is reduced at each subsequent phase. Between the $1^{st}$ and $2^{nd}$ phase there is a time gap $G_1$ where the UE receiver is switched off, and between the $2^{nd}$ and $3^{rd}$ phase there is a time gap $G_2$. This arrangement can optimise the power saving further when the traffic pattern is known, for example, the PDCCH at time $t_1$ can schedule a PUSCH in which case the UE may expect a retransmission or even an explicit HARQ ACK within the $1^{st}$ phase. An application response may occur later, after the first transmission, for example during the $2^{nd}$ phase. The UE does not expect data between the HARQ feedback and the application layer response and hence can save power by switching off its receiver. It should be appreciated by those skilled in the art that the DRX ON rate (or indeed, the periodic rate of switching between DRX ON and DRX OFF or the length of each DRX on period) may be reduced (or indeed, in some arrangements, increased) at each subsequent phase, without requiring gaps between each of the phases as shown in FIG. 11. In other words, the value of the DRX parameter is highest in a first of the plurality of phases and decreases over time such that the value of the DRX parameter is lowest in a last of the plurality of phases. Specifically with regard to the DRX ON rate being reduced at each subsequent phase as shown in FIG. 11, the proportion of the secondary DRX operation during which the communications device is in the secondary active operating mode is highest in a first of the plurality of phases and decreases over time such that the proportion of the secondary DRX operation during which the communications device is in the secondary active operating mode is lowest in a last of the plurality of phases.

The above described inactivity period embodiment is applicable to some embodiments of the short-DRX case: there may be a time gap between a phase where one set of short DRX parameters is applied and a phase where another set of short DRX parameters are applied. For example in a first phase, the drx-ShortCycle is 16 subframes and during a second phase, the drx-ShortCycle is 64 subframes and there is a gap of 256 subframes between these two phases. In other words, there is a time gap between two of the plurality of phases of the short DRX operation during which the communications device is in the secondary reduced power operating mode.

Figure 12:
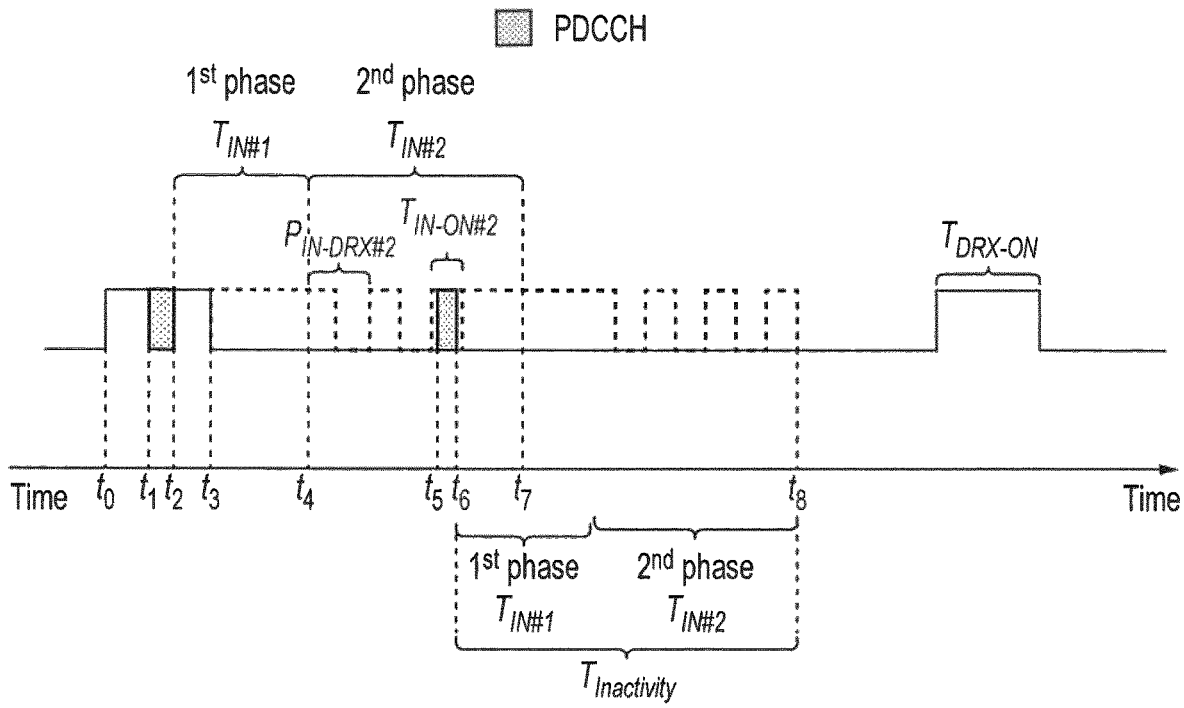
FIG. 12 shows an example of how the inactivity timer may be restarted with the first phase of the inactivity period in accordance with embodiments of the present technique.

In another arrangement of inactivity period embodiments of the present technique, if there is traffic activity during any phase of the inactivity period, the inactivity timer is restarted with the $1^{st}$ phase. In other words, the communications device is configured to determine if a second downlink transmission from the infrastructure equipment to the communications device is detected, and if a second downlink transmission from the infrastructure equipment to the communications device is detected, to restart the inactivity timer and to restart the secondary DRX operation beginning with the first phase. An example is shown in FIG. 12, where the inactivity timer is first triggered at time $t_2$ after detection of a PDCCH at time $t_1$ and the UE moves into the $1^{st}$ phase of the inactivity period with a 100% DRX ON rate. After time $T_{IN\#1}$, the UE moves into the $2^{nd}$ phase with a lower DRX ON rate (e.g. 50%) at time $t_4$. However, during the $2^{nd}$ phase, the UE detects another PDCCH at time $t_5$ and instead of continuing with the $2^{nd}$ phase till time $t_7$, it restarts its inactivity timer with the $1^{st}$ phase for $T_{IN\#1}$ before proceeding to the $2^{nd}$ phase for $T_{IN\#2}$ until it expires at time $t_8$.

Some embodiments applicable to short DRX comprise a variation on the above described inactivity period embodiment. In this variant, if there is activity during the DRX_ON duration of the short DRX operation, the UE stays in short DRX operation, rather than starting the inactivity timer. The drx-ShortCycleTimer can be reset if there is activity. In other words, the communications device is configured to determine if a downlink transmission from the infrastructure equipment to the communications device is detected, and if a downlink transmission from the infrastructure equipment to the communications device is detected, to restart the short DRX duration timer and to restart the short DRX operation beginning with the first phase.

Figure 13:
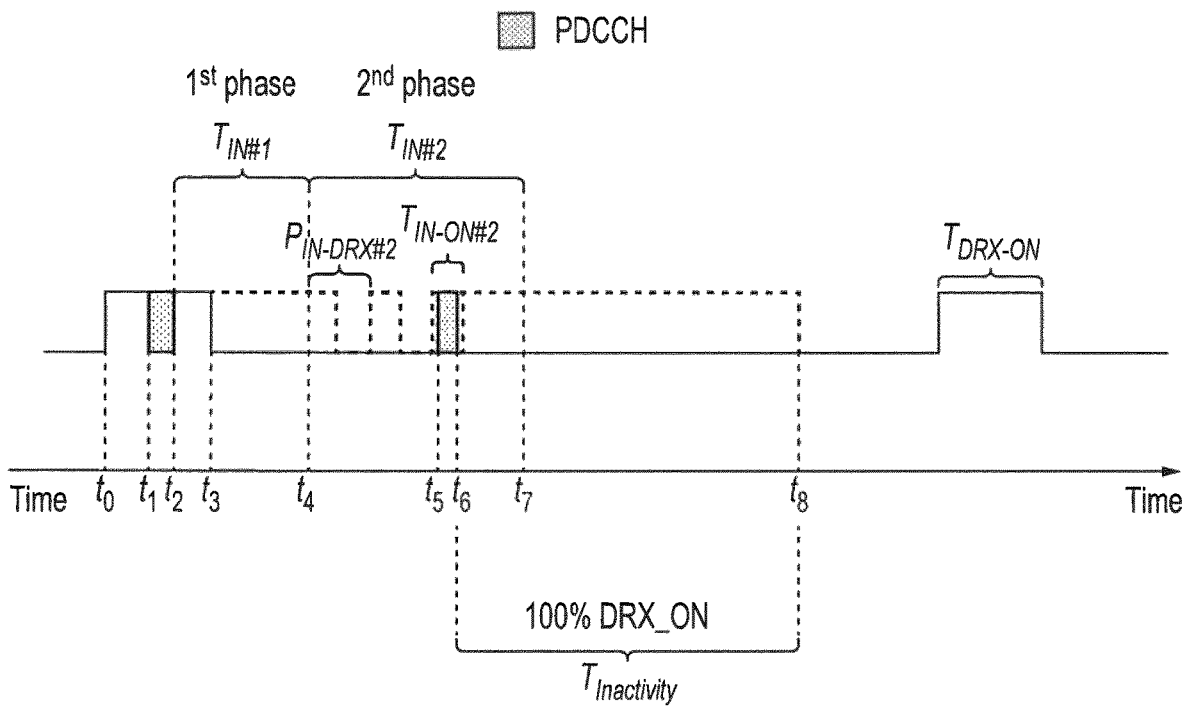
FIG. 13 shows an example of how the UE may revert to the operation of the first phase of the inactivity period for the remainder of the inactivity period after the inactivity timer has been reset in accordance with embodiments of the present technique.

In another arrangement of inactivity period embodiments of the present technique, related to the arrangement described above with respect to the example of FIG. 12, if there is traffic activity during any phase of the inactivity period, the inactivity timer is restarted with the $1^{st}$ phase and continues to operate with that first phase until the inactivity timer expires. In other words, the communications device is configured to determine if a second downlink transmission from the infrastructure equipment to the communications device is detected, and if a second downlink transmission from the infrastructure equipment to the communications device is detected, to restart the inactivity timer and to operate in accordance with the first phase for the duration of the restarted inactivity period. This arrangement attempts to save power (by going into the DRX-based inactivity phases) on the assumption that there is no further traffic. Once it is evident that there is further traffic, the UE operates "attentively" in the inactivity phase (by operating without DRX in the inactivity phase). An example of this operation is illustrated by FIG. 13, which shows that the inactivity period initially operates in two phases (100% DRX_ON rate and 50% DRX_ON rate). During the second phase, at time $t_5$, a PDCCH is decoded by the UE. This activity causes the UE to restart its inactivity timer, but now the UE operates with a single phase (i.e. 100% DRX_ON) during the whole of the inactivity period (from $t_6$ to $t_8$).

Some embodiments applicable to short DRX may be broadly equivalent to the above described inactivity period embodiment. When there are different phases of short DRX operation, if there is activity during any phase of short DRX, the UE reverts to operation with the parameters of the first phase of short DRX. For example in a first phase, the drx-ShortCycle is 16 subframes and during a second phase, the drx-ShortCycle is 64 subframes and if there is activity during either phase of the short DRX operation, the system reverts to operating with a drx-ShortCycle of 16 subframes for the remainder of the short-DRX operation. In other words, the communications device is configured to determine if a downlink transmission from the infrastructure equipment to the communications device is detected, and if a downlink transmission from the infrastructure equipment to the communications device is detected, to restart the short DRX duration timer and to operate in accordance with the first phase for the duration of the restarted short DRX period.

Figure 14A:
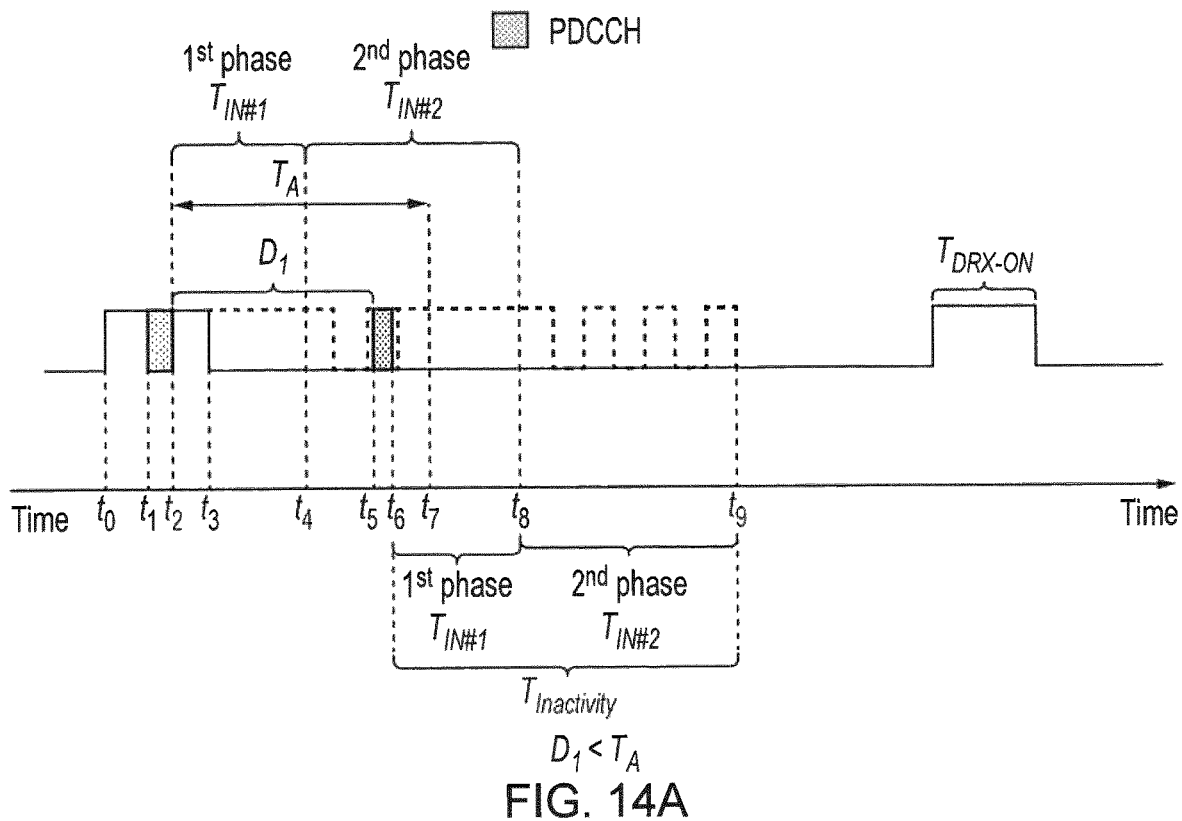
FIGS. 14A and 14B illustrate how the time between two pieces of traffic activity may be used to determine whether or not the inactivity period should be restarted with the first phase after the inactivity timer has been reset in accordance with embodiments of the present technique.
Figure 14B:
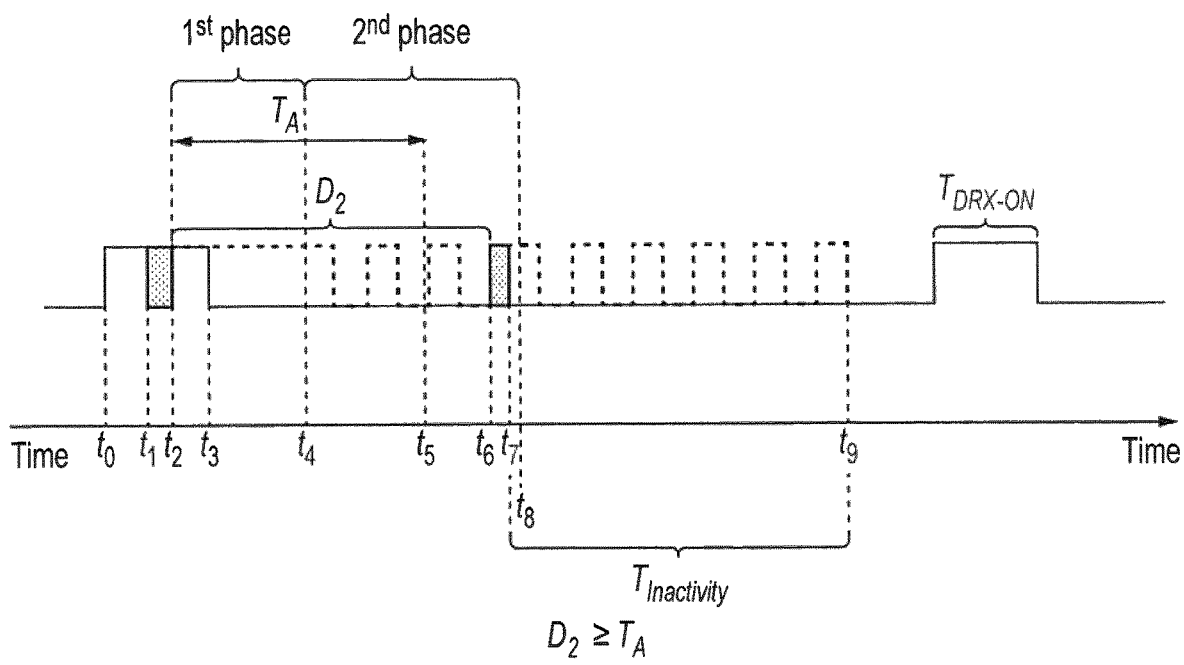

In another arrangement of inactivity period embodiments of the present technique, the inactivity period is restarted with the $1^{st}$ phase only if the time between two pieces of traffic activity is less than a threshold $T_A$, otherwise it continues with the current phase. It should be noted that here, the inactivity timer is still restarted. In other words, the communications device is configured to determine if a second downlink transmission from the infrastructure equipment to the communications device is detected, and if a second downlink transmission from the infrastructure equipment to the communications device is detected, to determine whether the time between detecting the first downlink transmission and detecting the second downlink transmission is less than a predetermined threshold time, wherein if the time between detecting the first downlink transmission and detecting the second downlink transmission is less than the predetermined threshold time, the communications device is configured to restart the inactivity timer and to restart the secondary DRX operation beginning with the first phase, and wherein if the time between detecting the first downlink transmission and detecting the second downlink transmission is greater than the predetermined threshold time, the communications device is configured to restart the inactivity timer and to operate in accordance with the current phase during which the second transmission is detected. Examples of this operation are shown in FIGS. 14A and 14B. In the scenarios illustrated by both FIG. 14A and FIG. 14B, the UE detects a PDCCH in the first DRX ON period, which triggers an inactivity timer. In the scenario shown in FIG. 14A, the UE detects another PDCCH at time $t_5$ where the time between the two PDCCH detections $D_1$ is less than the threshold $T_A$. Here, the UE restarts the inactivity period with the $1^{st}$ phase. In the scenario shown by FIG. 14B, the UE detects another PDCCH at time $t_6$, where the time between the two PDCCH detections $D_2$ is greater than the threshold $T_A$. Here, the UE restarts the inactivity period without reverting to the $1^{st}$ phase but instead continues with its current phase, which is the $2^{nd}$ phase. This arrangement assumes that if the traffic activity is high, i.e. traffic occurs within time $T_A$ then it is likely that the traffic will be more frequent in the near future and therefore requires a higher DRX ON rate. If the traffic activity is low then there is not much benefit in increasing the DRX ON rate.

Some embodiments applicable to short DRX may be broadly equivalent to the above described inactivity period embodiment. When there are different phases of short DRX operation, if the time between two pieces of traffic activity is less than a threshold, the system reverts to operation with the parameters of the first phase of short DRX. In other words, the communications device is configured to determine if a first downlink transmission from the infrastructure equipment to the communications device is detected, to determine if a second downlink transmission from the infrastructure equipment to the communications device is detected, and if a second downlink transmission from the infrastructure equipment to the communications device is detected, to determine whether the time between detecting the first downlink transmission and detecting the second downlink transmission is less than a predetermined threshold time, wherein if the time between detecting the first downlink transmission and detecting the second downlink transmission is less than the predetermined threshold time, the communications device is configured to restart the short DRX duration timer and to restart the short DRX operation beginning with the first phase, and wherein if the time between detecting the first downlink transmission and detecting the second downlink transmission is greater than the predetermined threshold time, the communications device is configured to restart the short DRX duration timer and to operate in accordance with the current phase during which the second downlink transmission is detected.

In another arrangement of inactivity period embodiments of the present technique, the characteristic or configuration of the inactivity period, e.g. the DRX ON rate in each phase and the number of phases, depends on the type of traffic. In other words, at least one of the number of phases of the DRX operation and the value of the DRX parameter of each of the phases of the DRX operation is dependent on a type of data traffic of the first downlink transmission. This is best described in an example shown in FIGS. 15A and 15B, where here the inactivity period is triggered by the reception of a PDSCH at time $t_3$. It should be noted that in these figures, the "type of traffic" is either "a successfully decoded PDSCH" or "an unsuccessfully decoded PDSCH". However, in general, the type of traffic could refer instead to the type of application (e.g. gaming or instant messaging). Here, we have two inactivity configurations, namely:

Config #1: 2 phases, with $1^{st}$ phase at 100% DRX ON rate and $2^{nd}$ phase at 50% DRX ON rate; and Config #2: 1 phase with 100% DRX ON rate.

Figure 15A:
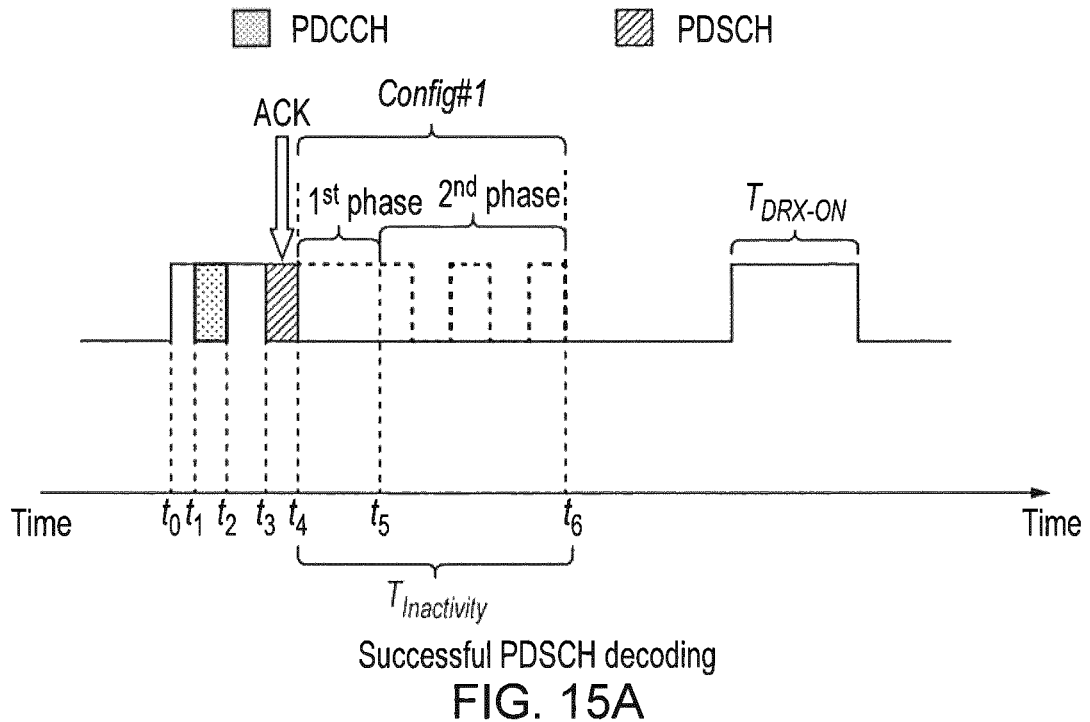
FIGS. 15A and 15B illustrate how the type of traffic affect the operation of the UE during the inactivity period in accordance with embodiments of the present technique.

The UE will use Config #1 if it successfully decodes the PDSCH, as shown in the scenario illustrated by FIG. 15A, thereby transmitting an ACK HARQ feedback to the gNodeB during the $1^{st}$ phase of the inactivity period (time $t_4$ and $t_5$). Config #1 has a reduced DRX ON rate since the UE would not receive further retransmission from the gNodeB. In the scenario illustrated by FIG. 15B, the UE fails to decode the PDSCH and therefore uses Config #2, which has a 100% DRX ON rate since the UE expects to receive a retransmission from the gNodeB. In other words, the operation of this arrangement can be phrased that at least one of the number of phases of the DRX operation and the value of the DRX parameter of each of the phases of the DRX operation is dependent on whether or not the first downlink transmission has been successfully decoded by the communications device. It should be noted that the gNodeB is not aware whether the PDSCH is successfully decoded or not before receiving the PUCCH with HARQ feedback and hence the initial part of the inactivity period of Config #1 and Config #2 needs to be the same, i.e., in this case a 100% DRX ON rate.

Some embodiments applicable to short DRX may be broadly equivalent to the above described inactivity period embodiment: the parameters applied to the short DRX operation depend on traffic type. E.g. if PDSCH decoding is unsuccessful, the UE uses a short DRX configuration with a long DRX_ON duration and a short drx-ShortCycle. If PDSCH decoding is successful, the UE uses a short DRX configuration with a short DRX_ON duration and a long drx-ShortCycle. In other words, the communications device is configured to determine if a downlink transmission from the infrastructure equipment to the communications device is detected, wherein at least one of the number of phases of the short DRX operation and the value of the short DRX parameter of each of the phases of the short DRX operation is dependent on a type of data traffic of the downlink transmission. Alternatively, or in addition, the communications device may be configured to determine if a downlink transmission from the infrastructure equipment to the communications device is detected, and to attempt to decode the downlink transmission, wherein at least one of the number of phases of the short DRX operation and the value of the short DRX parameter of each of the phases of the short DRX operation is dependent on whether the downlink transmission has been successfully decoded by the communications device.

Figure 15B:
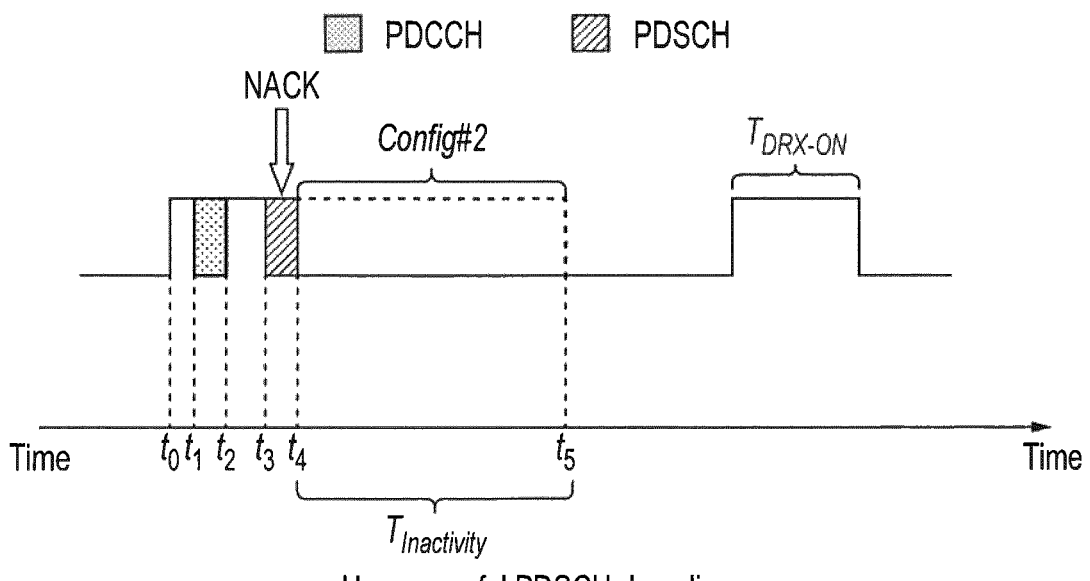

In a variation of the above described inactivity period (and equivalent short DRX) arrangement illustrated by FIGS. 15A and 15B, the inactivity configuration/characteristic used depends on the priority of the traffic. In other words, at least one of the number of phases of the DRX operation and the value of the DRX parameter of each of the phases of the DRX operation is dependent on a relative priority level of the type of data traffic of the first downlink transmission. For example if the DCI indicates that the traffic is of low latency or high priority then the UE would use a 100% DRX ON rate configuration otherwise it uses a configuration with a lower DRX ON rate. In another example, each type of traffic priority (e.g. based on the Logical Channel Priority at the MAC layer) corresponds to a different inactivity configuration/characteristic.

Some embodiments applicable to short DRX may be broadly equivalent to the above described inactivity period arrangement: the parameters applied to the short DRX operation depend on the priority of the traffic. For example, if the DCI indicates that the traffic is of low latency or high priority, the UE uses a short DRX configuration with a long DRX_ON duration and a short drx-ShortCycle (or with a drx-ShortCycle equal to the DRX_ON duration, meaning that the UE always monitors PDCCH). Otherwise, the UE uses a short DRX configuration with a short DRX_ON duration and a long drx-ShortCycle. In other words, at least one of the number of phases of the short DRX operation and the value of the short DRX parameter of each of the phases of the short DRX operation is dependent on a relative priority level of the type of data traffic of the downlink transmission.

In another arrangement of inactivity period embodiments of the present technique, if a pre-emption occurs on a data packet (PDSCH or PUSCH) the UE uses a $1^{st}$ inactivity configuration otherwise it uses a $2^{nd}$ inactivity configuration. The $1^{st}$ inactivity configuration has a higher DRX ON rate than the $2^{nd}$ inactivity configuration. In other words, the communications device is configured to determine whether the first downlink transmission is received in accordance with a pre-emption operation or whether an uplink transmission from the communications device to the infrastructure equipment is transmitted in accordance with the pre-emption operation, the pre-emption operation being an operation in which resources of the wireless access interface allocated to another communications device are used for the transmission (by the communications device that determines whether the first downlink transmission is received in accordance with a pre-emption operation or whether an uplink transmission from that communications device to the infrastructure equipment is transmitted in accordance with the pre-emption operation), wherein if either of the first downlink transmission or uplink transmission are in accordance with the pre-emption operation, to operate in accordance with a first configuration of the secondary DRX operation, and wherein if neither of the first downlink transmission or uplink transmission are in accordance with the pre-emption operation, to operate in accordance with a second configuration of the secondary DRX operation, wherein a proportion of the secondary DRX operation during which the communications device is in the secondary active operating mode is greater for the first configuration of the secondary DRX operation than for the second configuration of the secondary DRX operation. This arrangement works on the principle that if a pre-emption occurs on a PDSCH or PUSCH then it is likely that a retransmission of the pre-empted data packet is required, thereby the UE would rather benefit in using an inactivity timer with a high DRX ON rate than one with a low DRX ON rate. As those skilled in the art would appreciate, pre-emption is the case where a UE is scheduled with a data packet, e.g. PDSCH and during the transmission of the data packet the gNodeB decides to use some of the resources scheduled for this data packet for another transmission that may belong to a different UE.

Some embodiments applicable to short DRX may be broadly equivalent to the above described inactivity period embodiments: the parameters applied to the short DRX operation depend on whether pre-emption occurs on a data packet or not. In other words, the communications device is configured to determine whether a downlink transmission is received in accordance with a pre-emption operation or whether an uplink transmission from the communications device to the infrastructure equipment is transmitted in accordance with the pre-emption operation, the pre-emption operation being an operation in which resources of the wireless access interface allocated to another communications device are used for the transmission by the communication device, wherein if either of the downlink transmission or uplink transmission are in accordance with the pre-emption operation, to operate in accordance with a first configuration of the short DRX operation, and wherein if neither of the downlink transmission or uplink transmission are in accordance with the pre-emption operation, to operate in accordance with a second configuration of the short DRX operation, wherein a proportion of the short DRX operation during which the communications device is in the secondary active operating mode is greater for the first configuration of the short DRX operation than for the second configuration of the short DRX operation.

In another arrangement of inactivity period embodiments of the present technique, some of the phases in the inactivity period are controlled by WUS or GTS operation. Such WUS/GTS/GUS signals are described in further detail above. That is the UE would detect for the presence of a WUS (Wake Up Signal) or a GTS (Go To Sleep) signal (or go to sleep or wake up signal, GUS) to decide whether to turn on its receiver during the DRX ON period for that phase. In other words, instances of the secondary active operating mode of one or more of the phases of the secondary DRX operation are preceded by a wake-up signal, WUS, monitoring period, and the communications device is configured to determine, for each of the WUS monitoring periods, whether a WUS is received from the infrastructure equipment, wherein if a WUS is received during the WUS monitoring period, to switch into the secondary active operating mode for the instance of the secondary active operating mode preceded by the WUS monitoring period, and wherein if a WUS is not received during the WUS monitoring period, to switch into the secondary reduced power mode for the instance of the secondary active operating mode preceded by the WUS monitoring period. Alternatively, instances of the secondary active operating mode of one or more of the phases of the secondary DRX operation are preceded by a go-to-sleep signal, GTS, monitoring period, and the communications device is configured to determine, for each of the GTS monitoring periods, whether a GTS is received from the infrastructure equipment, wherein if a GTS is not received during the GTS monitoring period, to switch into the secondary active operating mode for the instance of the secondary active operating mode preceded by the GTS monitoring period, and wherein if a GTS is received during the GTS monitoring period, to switch into the secondary reduced power mode for the instance of the secondary active operating mode preceded by the GTS monitoring period.

Figure 16:
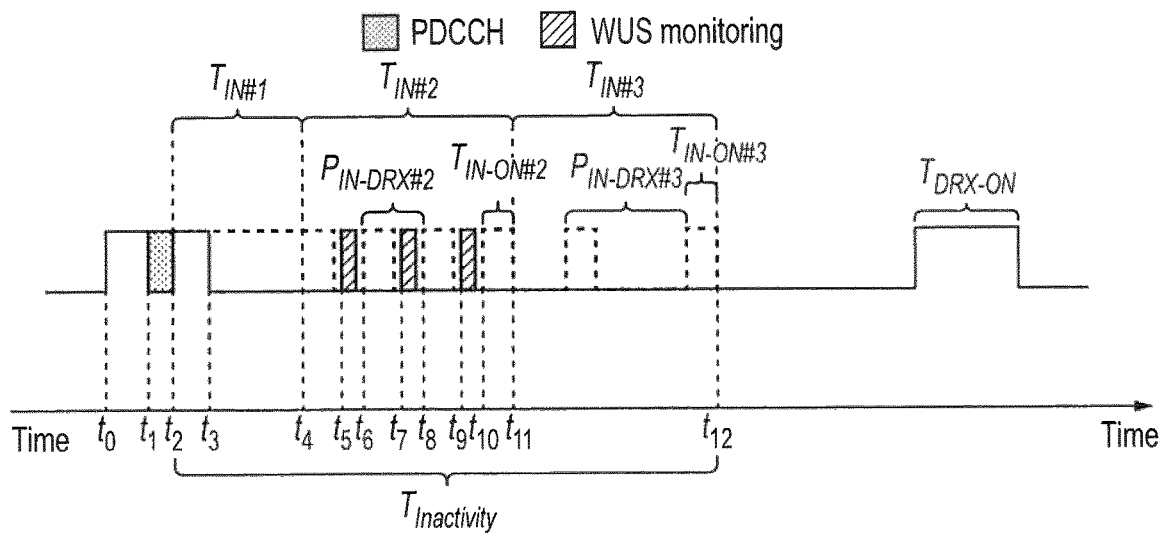
FIG. 16 shows an example of an inactivity phase comprising wake-up signal (WUS) monitoring in accordance with embodiments of the present technique.

An example of such operation with respect to a WUS signal is shown in FIG. 16 where the inactivity period that starts at time $t_2$ has 3 phases where in the $2^{nd}$ phase (between time $t_4$ and $t_{11}$), the UE would monitor for WUS at time $t_5$, $t_7$ and $t_9$ to determine if it needs to wake up for the corresponding DRX ON period at time $t_6$, $t_8$ and $t_{10}$ respectively. In this example, the $3^{rd}$ phase does not contain a WUS since it has a much lower DRX ON rate and it may be deemed to not be worth the effort of configuring a WUS. It should be noted that the WUS monitoring instances in FIG. 16 mean that the UE is required to wake up to try to detect for a potential WUS; it does not necessarily mean that there will actually be a WUS to detect.

Some embodiments applicable to short DRX may be broadly equivalent to the above described inactivity period embodiments: during some phases of short DRX operation, the DRX ON durations are controlled by WUS. In other words, instances of the secondary active operating mode of one or more of the phases of the short DRX operation are preceded by a wake-up signal, WUS, monitoring period, and the communications device is configured to determine, for each of the WUS monitoring periods, whether a WUS is received from the infrastructure equipment, wherein if a WUS is received during the WUS monitoring period, to switch into the secondary active operating mode for the instance of the secondary active operating mode preceded by the WUS monitoring period, and wherein if a WUS is not received during the WUS monitoring period, to switch into the secondary reduced power mode for the instance of the secondary active operating mode preceded by the WUS monitoring period. Alternatively, instances of the secondary active operating mode of one or more of the phases of the short DRX operation are preceded by a go-to-sleep signal, GTS, monitoring period, and the communications device is configured to determine, for each of the GTS monitoring periods, whether a GTS is received from the infrastructure equipment, wherein if a GTS is not received during the GTS monitoring period, to switch into the secondary active operating mode for the instance of the secondary active operating mode preceded by the GTS monitoring period, and wherein if a GTS is received during the GTS monitoring period, to switch into the secondary reduced power mode for the instance of the secondary active operating mode preceded by the GTS monitoring period.

In another arrangement of inactivity period embodiments of the present technique, for a phase of an inactivity period that contains WUS monitoring, if the UE detects a WUS then it would restart its inactivity period, e.g. starting with the $1^{st}$ phase. This is applicable for the case where the WUS is UE specific since the presence of a WUS would automatically indicate that there will be a PDCCH destined for the UE. In other words, for each of the WUS monitoring periods, if a WUS is received during the WUS monitoring period, the communications device is configured to restart the inactivity timer and to restart the secondary DRX operation beginning with the first phase.

Some embodiments applicable to short DRX may be broadly equivalent to the above described inactivity period embodiments: if the UE detects a WUS during short DRX operation, it would restart short DRX operation with the first short DRX phase. In other words, for each of the WUS monitoring periods, if a WUS is received during the WUS monitoring period, the communications device is configured to restart the short DRX duration timer and to restart the short DRX operation beginning with the first phase.

In another arrangement of inactivity period embodiments of the present technique, for a phase of an inactivity period that contains GTS monitoring, if the UE does NOT detect a GTS, it would restart its inactivity period with the 1$^{st}$ phase. In other words, for each of the GTS monitoring periods, if a GTS is not received during the GTS monitoring period, the communications device is configured to restart the inactivity timer and to restart the secondary DRX operation beginning with the first phase.

Some embodiments applicable to short DRX may be broadly equivalent to the above described inactivity period embodiments: if the does NOT detect GTS during short DRX operation, it would restart short DRX operation with the first short DRX phase. In other words, for each of the GTS monitoring periods, if a GTS is not received during the GTS monitoring period, the communications device is configured to restart the short DRX duration timer and to restart the short DRX operation beginning with the first phase.

Figure 17A:
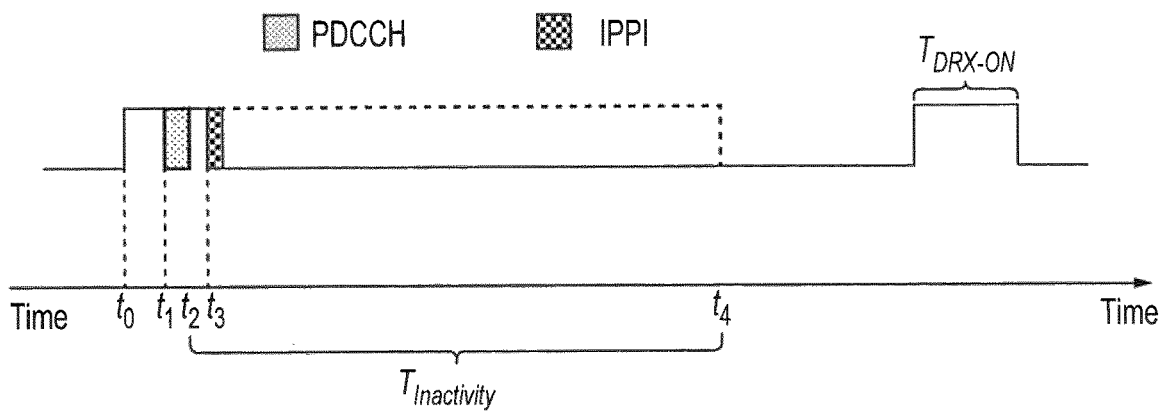
FIGS. 17A and 17B illustrate examples of how inactivity phase parameters may be signalled by an inactivity period indication signal in accordance with embodiments of the present technique.
Figure 17B:
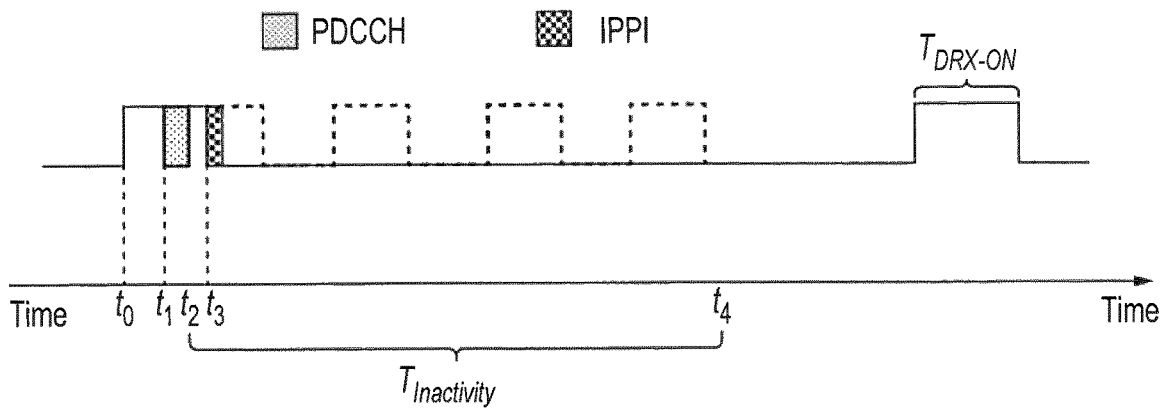

The WUS (or GTS) is a signal that the UE can easily decode, potentially with low power consumption. The parameters of the inactivity period can themselves be signalled by a signal with similar characteristics to a WUS signal; which may be termed an "inactivity phase parameter indication" (IPPI) signal. For example, when the UE is about to enter an inactivity phase, an IPPI signal can indicate the DRX parameters to apply during the inactivity phase. In other words, one or both of the number of phases of the secondary DRX operation and the at least one DRX parameter for each of the phases of the secondary DRX operation are indicated to the communications device by an inactivity period indication signal received from the infrastructure equipment. For example, the IPPI signal could indicate that the UE should operate with a 50% DRX_ON rate during the inactivity phase or with a 100% DRX_ON rate during the inactivity phase. This operation is illustrated in FIGS. 17A and 17B, where the scenario illustrated by FIG. 17A shows an IPPI that instructs the UE to operate the inactivity phase with a 100% DRX_ON mode of operation and the scenario illustrated by FIG. 17B shows an IPPI that instructs the UE to operate the inactivity phase with a 50% DRX_ON mode of operation.

This IPPI can apply equally to the short DRX embodiments as to the inactivity period embodiments. As such, an IPPI, which may be a WUS signal (or some other signal), at (or before) the start of the short DRX phase indicates the short DRX parameters to apply during the short DRX phase. For example, there are two possible short-DRX configurations and two phases. The first configuration has a DRX_ON duration of 8 subframes and the second configuration has a DRX_ON duration of 4 subframes. Both configurations have a drx-ShortCycle of 16 subframes. A WUS before the short DRX phase indicates which of the configurations applies to the upcoming short DRX phase. It should be appreciated by those skilled in the art that the number of short DRX phases can be different to the number of short DRX configurations. In other words, one or both of the number of phases of the short DRX operation and the at least one short DRX parameter for each of the phases of the short DRX operation are indicated to the communications device by a short DRX period indication signal received from the infrastructure equipment. Here, the short DRX period indication signal may be carried by a WUS.

In an arrangement of inactivity period embodiments of the present technique, the inactivity configurations, for example, DRX cycles and phases, are RRC configured. In other words, one or both of the number of phases of the secondary DRX operation and the at least one DRX parameter for each of the phases of the secondary DRX operation are indicated to the communications device via Radio Resource Control, RRC, signalling received from the infrastructure equipment.

Some embodiments applicable to short DRX may be broadly equivalent to the above described inactivity period embodiments: short DRX parameters and phases are configured by RRC. In Release 15, one set of short DRX parameters can be configured (possibly per bandwidth part) to the UE. Embodiments of the present technique provide novel solutions in which more than one set of short DRX parameters can be configured to the UE, and in which different short DRX phases (and the specific arrangements relating to this) may be configured. In other words, one or both of the number of phases of the short DRX operation and the at least one short DRX parameter for each of the phases of the short DRX operation are indicated to the communications device via Radio Resource Control, RRC, signalling received from the infrastructure equipment.

In another arrangement of inactivity period embodiments of the present technique, the inactivity configurations, for example, DRX cycles and phases are indicated in the DCI. That is, the PDCCH carrying the DCI that triggers the inactivity period contains this said configurations. In other words, one or both of the number of phases of the secondary DRX operation and the at least one DRX parameter for each of the phases of the secondary DRX operation are indicated to the communications device in a Downlink Control Indication, DCI, message received from the infrastructure equipment. In addition to the DRX parameter of the inactivity period, the DCI can also indicate the inactivity timer, i.e. the duration of the inactivity period. For example there may be a default duration for the inactivity period (e.g. configured by the RRC layer) and the DCI can indicate a different inactivity timer, i.e. different duration of the inactivity period.

Some embodiments applicable to short DRX may be broadly equivalent to the above described inactivity period embodiments: short DRX parameters and phases are configured by DCI. In other words, one or both of the number of phases of the short DRX operation and the at least one short DRX parameter for each of the phases of the short DRX operation are indicated to the communications device in a Downlink Control Indication, DCI, message received from the infrastructure equipment.

It should be noted that the inactivity timer may also be used for UE to move into DRX mode (or indeed, operate in accordance with another power consumption optimised mode technique as described above) from an active connected mode, that is it is used before the UE moves into DRX. Once the inactivity timer expires, the UE will operate in accordance with the legacy/primary DRX operation as previously described. In other words, such inactivity period embodiments relate to a communications device configured to receive signals from an infrastructure equipment of a wireless communications network, the communications device operating in accordance with an active connected mode, the communications device comprising a receiver configured to receive signals via a wireless access interface provided by the wireless communications network, and a controller configured in combination with the receiver to monitor for signals transmitted by the infrastructure equipment to the communications device while the communications device is operating in accordance with the active connected mode, to start, upon detection of a first downlink transmission from the infrastructure equipment to the communications device, an inactivity timer specifying an inactivity period during which the communications device switches from the active connected mode into a power consumption optimised mode, wherein when the inactivity period ends, the communications device switches to a legacy discontinuous reception, DRX, operation, where the communications device periodically switches, in accordance with a first periodic rate, between a primary active operating mode and a primary reduced power operating mode. In some arrangements, the communications device is configured, in the power consumption optimised mode, to periodically switch, at least at a second periodic rate, between a secondary active operating mode and a secondary reduced power operating mode in accordance with a secondary DRX operation during the inactivity period, the second periodic rate being higher than the first periodic rate.

Some embodiments applicable to short DRX may be broadly equivalent to the above described inactivity period embodiments: short DRX is also used for UE to move into DRX mode from an active connected mode. In other words, such short DRX embodiments relate to a communications device configured to receive signals from an infrastructure equipment of a wireless communications network, the communications device operating in accordance with an active connected mode, the communications device comprising a receiver configured to receive signals via a wireless access interface provided by the wireless communications network, and a controller configured in combination with the receiver to monitor for signals transmitted by the infrastructure equipment to the communications device while the communications device is operating in accordance with the active connected mode, to determine that the communications device should switch from the active connected mode to operate in accordance with a short DRX operation in which the communications device is configured to switch at least at a second periodic rate between a secondary active operating mode and a secondary reduced power operating mode, to start, subsequent to determining that the communications device should operate in accordance with the short DRX operation, a short DRX duration timer specifying a short DRX period during which the communications device operates in accordance with the short DRX operation before switching to a legacy discontinuous reception, DRX, operation, where the communications device periodically switches, in accordance with a first periodic rate, between a primary active operating mode and a primary reduced power operating mode, wherein at least one parameter of the short DRX operation is different to the at least one parameter of the legacy DRX operation.

All the arrangements of inactivity period and short DRX embodiments of the present technique described above and herein are applicable to this case too (in which the inactivity timer or short DRX may be used for UE to move into DRX mode), both those relating to a communications device and its circuitry and methods of its operation, and to an infrastructure equipment and its circuitry and methods of its operation.

It should be appreciated by those skilled in the art that the arrangements of inactivity period embodiments of the present technique described above in relation to the figures, while relating to the specific embodiments of the secondary DRX operation being performed during the inactivity period, could also equally be applied to the alternative implementations of the power consumption optimised mode than the secondary DRX operation. Essentially, those skilled in the art would be able to apply such arrangements to the case where the communications device monitors a smaller bandwidth, fewer beams or fewer antenna ports, or where cross-slot scheduling is performed (or indeed any combination of these and/or the secondary DRX operation). As a non-limiting example, the skilled person would understand how to, and that it would be within the scope of the present disclosure to, restart the inactivity timer if a second PDCCH (second downlink transmission) is received, during a second phase, within a certain time of the first PDCCH (first downlink transmission) to restart the inactivity timer and move back to the first phase where a higher number of beams are monitored than during the second phase. Of course, this example is non-limiting and provided for illustrative purposes only and the skilled person would understand that all arrangements described with respect to at least FIGS. 11 to 17 and defined by the appended claims could apply equally to the cases where the communications device monitors a smaller bandwidth, fewer beams or fewer antenna ports, or where cross-slot scheduling is performed as they do to the case where the communications device operates in accordance with the secondary DRX operation.

Flow Chart Representations

Figure 18:
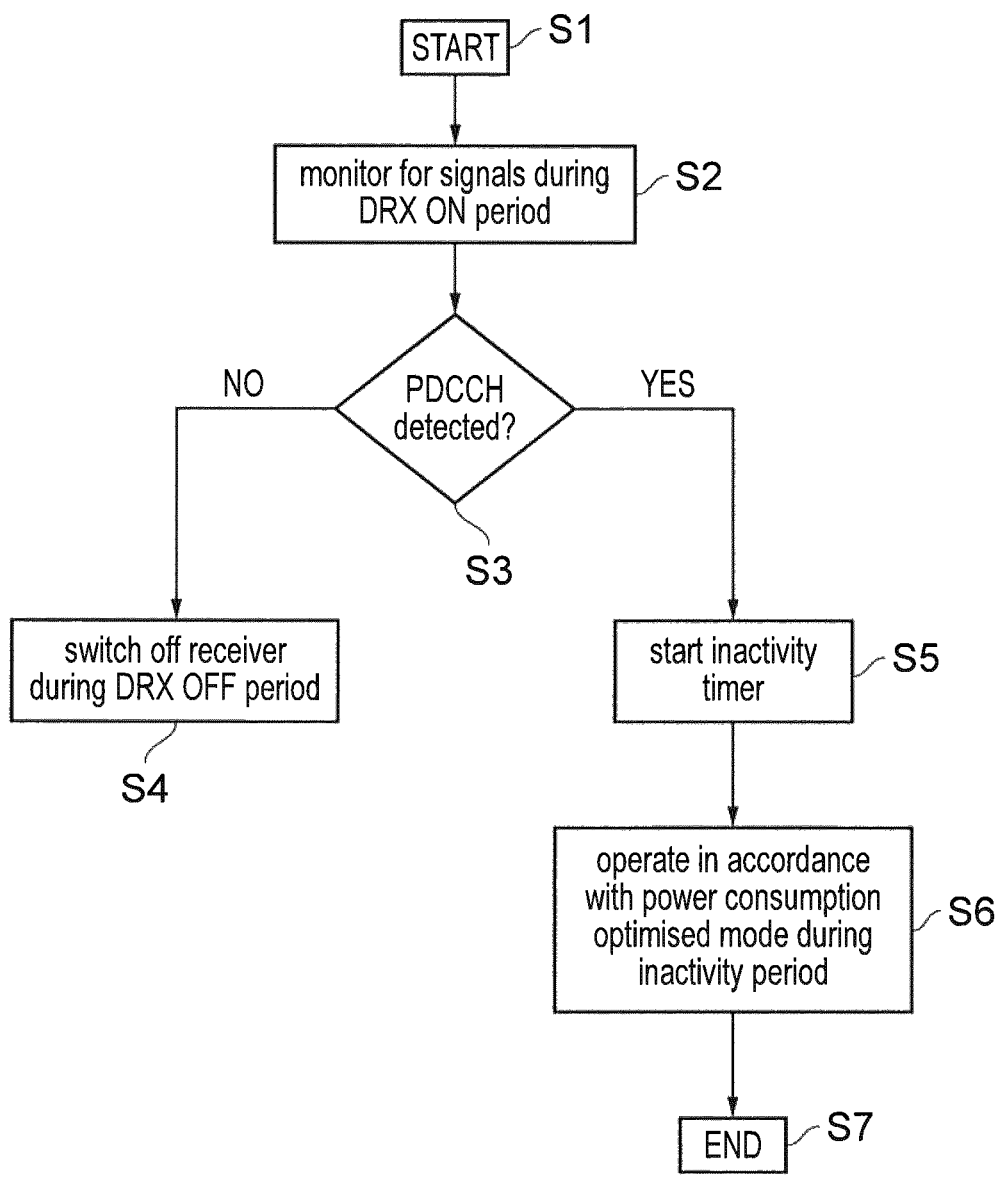
FIG. 18 is a flow diagram representation of a first method of operating a communications device according to embodiments of the present technique.

FIG. 18 shows a flow diagram illustrating a first method of operating a communications device according to embodiments of the present technique. The communications device is configured to receive signals from an infrastructure equipment of a wireless communications network, and the communications device is configured to periodically switch, in accordance with a first periodic rate, between a primary active operating mode and a primary reduced power operating mode in accordance with a primary discontinuous reception, DRX, operation.

The method begins in step S1. The method comprises, in step S2, monitoring for signals transmitted by the infrastructure equipment to the communications device via a wireless access interface provided by the wireless communications network during the primary active operating mode. In step S3, the method comprises determining, by the communications device, whether a first downlink transmission (e.g. a PDCCH) from the infrastructure equipment has been detected. If no such downlink transmission is detected, then the process moves to step S4, which comprises switching off the receiver during the primary reduced power operating mode (i.e. DRX OFF), but should a downlink transmission be detected, the method then advances to step S5, which comprises starting, during an instance of the primary active operating mode upon detection of the first downlink transmission from the infrastructure equipment to the communications device, an inactivity timer specifying an inactivity period during which the communications device does not switch into the primary reduced power operating mode. The process then comprises, in step S6, operating, during the inactivity period, in a power consumption optimised mode. The process ends in step S7.

Figure 19:
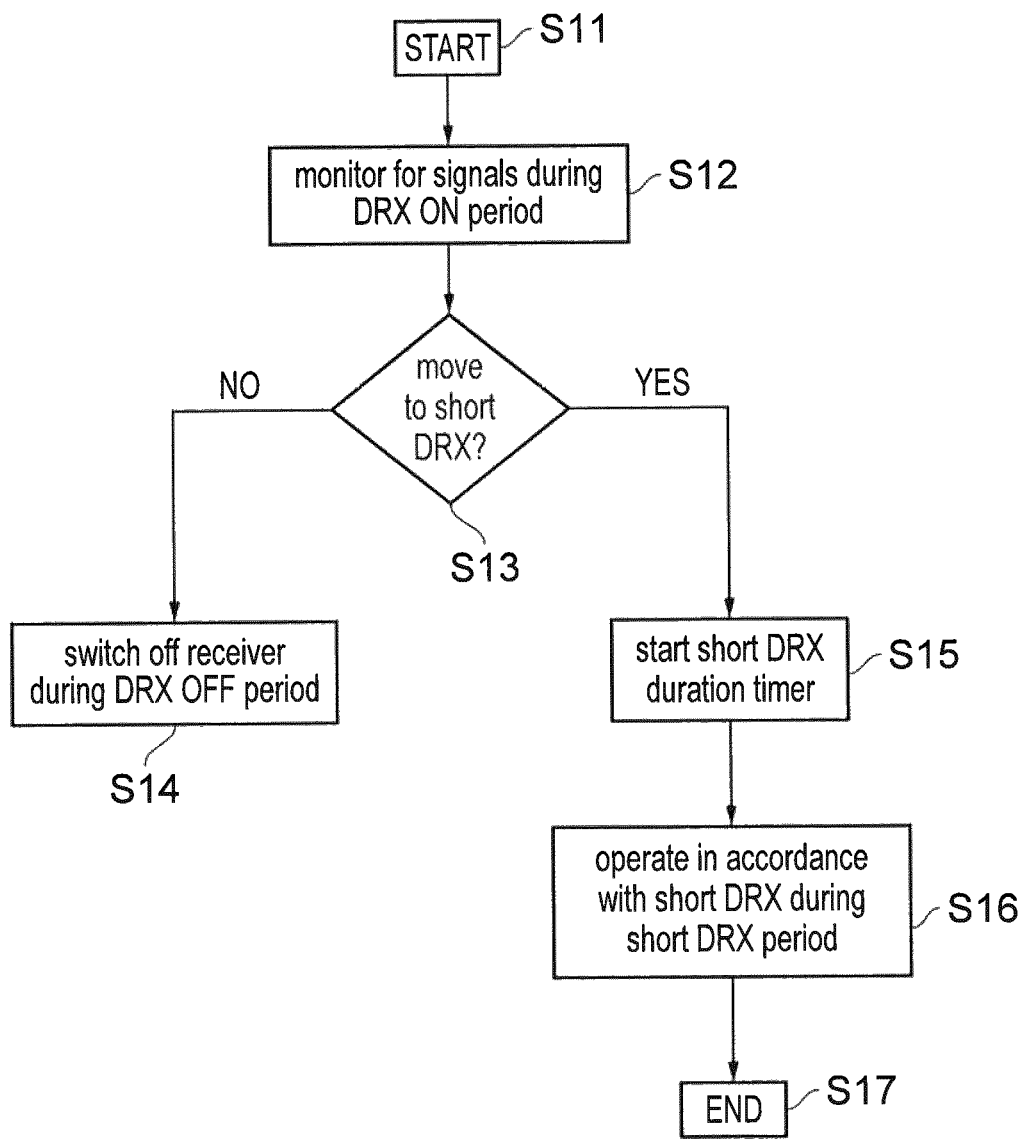
FIG. 19 is a flow diagram representation of a second method of operating a communications device according to embodiments of the present technique.

FIG. 19 shows a flow diagram illustrating a second method of operating a communications device according to embodiments of the present technique. The communications device is configured to receive signals from an infrastructure equipment of a wireless communications network, and the communications device is configured to periodically switch, in accordance with a first periodic rate, between a primary active operating mode and a primary reduced power operating mode in accordance with a primary discontinuous reception, DRX, operation.

The method begins in step S11. The method comprises, in step S12, monitoring for signals transmitted by the infrastructure equipment to the communications device via a wireless access interface provided by the wireless communications network during the primary active operating mode (i.e. DRX ON). In step S13, the method comprises determining that the communications device should switch from the primary DRX operation to operate in accordance with a short DRX operation in which the communications device is configured to switch at least at a second periodic rate between a secondary active operating mode and a secondary reduced power operating mode. If the communications device does not determine that it should switch to operate in accordance with the short DRX operation, then the process moves to step S14, which comprises switching off the receiver during the primary reduced power operating mode (i.e. DRX OFF). However should the communications device determine that it should switch to operate in accordance with the short DRX operation, the method then advances to step S15, which comprises starting, subsequent to determining that the communications device should operate in accordance with the short DRX operation, a short DRX duration timer specifying a short DRX period during which the communications device operates in accordance with the short DRX operation before switching back to the primary DRX operation. At least one parameter of the short DRX operation is different to the at least one parameter of the primary DRX operation. In step S16, the process comprises operating in accordance with the short DRX operation. The process ends in step S17.

Those skilled in the art would appreciate that the method shown by FIG. 18 or 19 may be adapted in accordance with embodiments of the present technique. For example, other intermediate steps may be included in the method, or the steps may be performed in any logical order.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A communications device configured to receive signals from an infrastructure equipment of a wireless communications network, the communications device being configured to switch at a first periodic rate between a primary active operating mode and a primary reduced power operating mode in accordance with a primary discontinuous reception, DRX, operation, the communications device comprising
- a receiver configured to receive signals via a wireless access interface provided by the wireless communications network, and
- a controller configured in combination with the receiver
  - to monitor for signals transmitted by the infrastructure equipment to the communications device during the primary active operating mode,
  - to reduce an operating power of the receiver during the primary reduced power operating mode, and
  - to start, during an instance of the primary active operating mode upon detection of a first downlink transmission from the infrastructure equipment to the communications device, an inactivity timer specifying an inactivity period during which the communications device does not switch into the primary reduced power operating mode, wherein the communications device is configured, during the inactivity period, to operate in a power consumption optimised mode.

Paragraph 2. A communications device according to Paragraph 1, wherein the communications device is configured, in the power consumption optimised mode, to switch at least at a second periodic rate, between a secondary active operating mode and a secondary reduced power operating mode in accordance with a secondary DRX operation during the inactivity period, the second periodic rate being higher than the first periodic rate.

Paragraph 3. A communications device according to Paragraph 1 or Paragraph 2, wherein the communications device is configured, in the power consumption optimised mode, to operate with a reduced bandwidth compared to a bandwidth with which the communications device operates when not in the power consumption optimised mode.

Paragraph 4. A communications device according to any of Paragraphs 1 to 3, wherein the communications device is configured, in the power consumption optimised mode, to monitor fewer beams compared to a number of beams that the communications device is configured to monitor when not in the power consumption optimised mode.

Paragraph 5. A communications device according to any of Paragraphs 1 to 4, wherein the communications device is configured, in the power consumption optimised mode, to monitor fewer transmit antenna ports compared to a number of transmit antenna ports that the communications device is configured to monitor when not in the power consumption optimised mode.

Paragraph 6. A communications device according to any of Paragraphs 1 to 5, wherein the communications device is configured, in the power consumption optimised mode, to perform cross-slot scheduling.

Paragraph 7. A communications device according to Paragraph 2, wherein the communications device is configured to remain in the primary active operating mode after starting the inactivity timer until the end of the instance of the primary active operating mode in which the inactivity timer was started.

Paragraph 8 A communications device according to any of Paragraphs 1 to 6, wherein the power consumption optimised mode comprises a plurality of phases, each of the phases having a different value of at least one parameter.

Paragraph 9. A communications device according to Paragraph 2 or Paragraph 7, wherein the secondary DRX operation comprises a plurality of phases, each of the phases having a different value of at least one DRX parameter.

Paragraph 10. A communications device according to Paragraph 9, wherein the at least one DRX parameter comprises a proportion of the secondary DRX operation during which the communications device is in the secondary active operating mode.

Paragraph 11. A communications device according to Paragraph 9 or Paragraph 10, wherein the at least one DRX parameter comprises a time duration that the communications device is in each instance of the second active operating mode during the secondary DRX operation.

Paragraph 12. A communications device according to any of Paragraphs 9 to 11, wherein there is a time gap between two of the plurality of phases of the secondary DRX operation during which the communications device is in the secondary reduced power operating mode.

Paragraph 13. A communications device according to any of Paragraphs 9 to 12, wherein the proportion of the secondary DRX operation during which the communications device is in the secondary active operating mode is highest in a first of the plurality of phases and decreases over time such that the proportion of the secondary DRX operation during which the communications device is in the secondary active operating mode is lowest in a last of the plurality of phases.

Paragraph 14. A communications device according to any of Paragraphs 9 to 13, wherein the communications device is configured
- to determine if a second downlink transmission from the infrastructure equipment to the communications device is detected, and
- if a second downlink transmission from the infrastructure equipment to the communications device is detected, to restart the inactivity timer and to restart the secondary DRX operation beginning with the first phase.

Paragraph 15. A communications device according to any of Paragraphs 9 to 14, wherein the communications device is configured
- to determine if a second downlink transmission from the infrastructure equipment to the communications device is detected, and
- if a second downlink transmission from the infrastructure equipment to the communications device is detected, to restart the inactivity timer and to operate in accordance with the first phase for the duration of the restarted inactivity period.

Paragraph 16. A communications device according to any of Paragraphs 9 to 15, wherein the communications device is configured
- to determine if a second downlink transmission from the infrastructure equipment to the communications device is detected, and
- if a second downlink transmission from the infrastructure equipment to the communications device is detected, to determine whether the time between detecting the first downlink transmission and detecting the second downlink transmission is less than a predetermined threshold time, wherein
- if the time between detecting the first downlink transmission and detecting the second downlink transmission is less than the predetermined threshold time, the communications device is configured to restart the inactivity timer and to restart the secondary DRX operation beginning with the first phase, and wherein
- if the time between detecting the first downlink transmission and detecting the second downlink transmission is greater than the predetermined threshold time, the communications device is configured to restart the inactivity timer and to operate in accordance with the current phase during which the second transmission is detected.

Paragraph 17. A communications device according to any of Paragraphs 9 to 16, wherein at least one of the number of phases of the DRX operation and the value of the DRX parameter of each of the phases of the DRX operation is dependent on a type of data traffic of the first downlink transmission.

Paragraph 18. A communications device according to Paragraph 17, wherein at least one of the number of phases of the DRX operation and the value of the DRX parameter of each of the phases of the DRX operation is dependent on a relative priority level of the type of data traffic of the first downlink transmission.

Paragraph 19. A communications device according to any of Paragraphs 9 to 18, wherein at least one of the number of phases of the DRX operation and the value of the DRX parameter of each of the phases of the DRX operation is dependent on whether or not the first downlink transmission has been successfully decoded by the communications device.

Paragraph 20. A communications device according to any of Paragraphs 9 to 19, wherein instances of the secondary active operating mode of one or more of the phases of the secondary DRX operation are preceded by a wake-up signal, WUS, monitoring period, and the communications device is configured
- to determine, for each of the WUS monitoring periods, whether a WUS is received from the infrastructure equipment, wherein
- if a WUS is received during the WUS monitoring period, to switch into the secondary active operating mode for the instance of the secondary active operating mode preceded by the WUS monitoring period, and wherein
- if a WUS is not received during the WUS monitoring period, to switch into the secondary reduced power mode for the instance of the secondary active operating mode preceded by the WUS monitoring period.

Paragraph 21. A communications device according to Paragraph 20, wherein, for each of the WUS monitoring periods, if a WUS is received during the WUS monitoring period, the communications device is configured to restart the inactivity timer and to restart the secondary DRX operation beginning with the first phase.

Paragraph 22. A communications device according to any of Paragraphs 9 to 21, wherein instances of the secondary active operating mode of one or more of the phases of the secondary DRX operation are preceded by a go-to-sleep signal, GTS, monitoring period, and the communications device is configured
- to determine, for each of the GTS monitoring periods, whether a GTS is received from the infrastructure equipment, wherein
- if a GTS is not received during the GTS monitoring period, to switch into the secondary active operating mode for the instance of the secondary active operating mode preceded by the GTS monitoring period, and wherein
- if a GTS is received during the GTS monitoring period, to switch into the secondary reduced power mode for the instance of the secondary active operating mode preceded by the GTS monitoring period.

Paragraph 23. A communications device according to Paragraph 22, wherein, for each of the GTS monitoring periods, if a GTS is not received during the GTS monitoring period, the communications device is configured to restart the inactivity timer and to restart the secondary DRX operation beginning with the first phase.

Paragraph 24. A communications device according to any of Paragraphs 9 to 23, wherein one or both of the number of phases of the secondary DRX operation and the at least one DRX parameter for each of the phases of the secondary DRX operation are indicated to the communications device by an inactivity period indication signal received from the infrastructure equipment.

Paragraph 25. A communications device according to any of Paragraphs 9 to 24, wherein one or both of the number of phases of the secondary DRX operation and the at least one DRX parameter for each of the phases of the secondary DRX operation are indicated to the communications device via Radio Resource Control, RRC, signalling received from the infrastructure equipment.

Paragraph 26. A communications device according to any of Paragraphs 9 to 25, wherein one or both of the number of phases of the secondary DRX operation and the at least one DRX parameter for each of the phases of the secondary DRX operation are indicated to the communications device in a Downlink Control Indication, DCI, message received from the infrastructure equipment.

Paragraph 27. A communications device according to any of Paragraphs 2, 7 or 9 to 26, wherein the communications device is configured
- to determine whether the first downlink transmission is received in accordance with a pre-emption operation or whether an uplink transmission from the communications device to the infrastructure equipment is transmitted in accordance with the pre-emption operation, the pre-emption operation being an operation in which resources of the wireless access interface allocated to another communications device are used for the transmission by the communication device, wherein
- if either of the first downlink transmission or uplink transmission are in accordance with the pre-emption operation, to operate in accordance with a first configuration of the secondary DRX operation, and wherein
- if neither of the first downlink transmission or uplink transmission are in accordance with the pre-emption operation, to operate in accordance with a second configuration of the secondary DRX operation,
- wherein a proportion of the secondary DRX operation during which the communications device is in the secondary active operating mode is greater for the first configuration of the secondary DRX operation than for the second configuration of the secondary DRX operation.

Paragraph 28. A method of operating a communications device configured to receive signals from an infrastructure equipment of a wireless communications network, the communications device being configured to periodically switch, in accordance with a first periodic rate, between a primary active operating mode and a primary reduced power operating mode in accordance with a primary discontinuous reception, DRX, operation, the method comprising
- monitoring for signals transmitted by the infrastructure equipment to the communications device via a wireless access interface provided by the wireless communications network during the primary active operating mode,
- reducing an operating power of the receiver during the primary reduced power operating mode, and
- starting, during an instance of the primary active operating mode upon detection of a first downlink transmission from the infrastructure equipment to the communications device, an inactivity timer specifying an inactivity period during which the communications device does not switch into the primary reduced power operating mode,
- wherein the communications device operates, during the inactivity period, in a power consumption optimised mode.

Paragraph 29. Circuitry for a communications device configured to receive signals from an infrastructure equipment of a wireless communications network, the communications device being configured to periodically switch, in accordance with a first periodic rate, between a primary active operating mode and a primary reduced power operating mode in accordance with a primary discontinuous reception, DRX, operation, the communications device comprising
- receiver circuitry configured to receive signals via a wireless access interface provided by the wireless communications network, and
- controller circuitry configured in combination with the receiver circuitry
- to monitor for signals transmitted by the infrastructure equipment to the communications device during the primary active operating mode,
- to reduce an operating power of the receiver circuitry during the primary reduced power operating mode, and
- to start, during an instance of the primary active operating mode upon detection of a first downlink transmission from the infrastructure equipment to the communications device, an inactivity timer specifying an inactivity period during which the communications device does not switch into the primary reduced power operating mode,
- wherein the communications device is configured, during the inactivity period, to operate in a power consumption optimised mode.

Paragraph 30. An infrastructure equipment forming part of a wireless communications network configured to transmit signals a communications device, the communications device periodically switching, in accordance with a first periodic rate, between a primary active operating mode and a primary reduced power operating mode in accordance with a primary discontinuous reception, DRX, operation, the infrastructure equipment comprising
- a transceiver configured to transmit signals and receive signals via a wireless access interface provided by the wireless communications network, and
- a controller configured to control the transceiver
- to transmit a downlink signal to the communications device during the primary active operating mode,
- to transmit, to the communications device, an indication of a number of phases of a secondary DRX operation and at least one DRX parameter for each of the phases of the secondary DRX operation,
- wherein the communications device operates during an inactivity period triggered by the transmission of the downlink signal to the communications device by the infrastructure equipment, in a power consumption optimised mode.

Paragraph 31. A method of operating an infrastructure equipment forming part of a wireless communications network configured to transmit signals a communications device, the communications device periodically switching, in accordance with a first periodic rate, between a primary active operating mode and a primary reduced power operating mode in accordance with a primary discontinuous reception, DRX, operation, method comprising
- transmitting a downlink signal to the communications device via a wireless access interface provided by the wireless communications network during the primary active operating mode,
- transmitting, to the communications device, an indication of a number of phases of a secondary DRX operation and at least one DRX parameter for each of the phases of the secondary DRX operation,
- wherein the communications device operates during an inactivity period triggered by the transmission of the downlink signal to the communications device by the infrastructure equipment, in a power consumption optimised mode.

Paragraph 32. Circuitry for an infrastructure equipment forming part of a wireless communications network configured to transmit signals a communications device, the communications device periodically switching, in accordance with a first periodic rate, between a primary active operating mode and a primary reduced power operating mode in accordance with a primary discontinuous reception, DRX, operation, the infrastructure equipment comprising
   transceiver circuitry configured to transmit signals and receive signals via a wireless access interface provided by the wireless communications network, and
   controller circuitry configured to control the transceiver circuitry
     to transmit a downlink signal to the communications device during the primary active operating mode,
     to transmit, to the communications device, an indication of a number of phases of a secondary DRX operation and at least one DRX parameter for each of the phases of the secondary DRX operation,
     wherein the communications device operates during an inactivity period triggered by the transmission of the downlink signal to the communications device by the infrastructure equipment, in a power consumption optimised mode.

Paragraph 33. A communications device configured to receive signals from an infrastructure equipment of a wireless communications network, the communications device operating in accordance with an active connected mode, the communications device comprising
   a receiver configured to receive signals via a wireless access interface provided by the wireless communications network, and
   a controller configured in combination with the receiver
     to monitor for signals transmitted by the infrastructure equipment to the communications device while the communications device is operating in accordance with the active connected mode,
     to start, upon detection of a first downlink transmission from the infrastructure equipment to the communications device, an inactivity timer specifying an inactivity period during which the communications device switches from the active connected mode into a power consumption optimised mode,
     wherein when the inactivity period ends, the communications device switches to a legacy discontinuous reception, DRX, operation, where the communications device periodically switches, in accordance with a first periodic rate, between a primary active operating mode and a primary reduced power operating mode.

Paragraph 34. A communications device according to Paragraph 33, wherein the communications device is configured, in the power consumption optimised mode, to periodically switch, at least at a second periodic rate, between a secondary active operating mode and a secondary reduced power operating mode in accordance with a secondary DRX operation during the inactivity period, the second periodic rate being higher than the first periodic rate.

Paragraph 35. A communications device configured to receive signals from an infrastructure equipment of a wireless communications network, the communications device being configured to switch at a first periodic rate between a primary active operating mode and a primary reduced power operating mode in accordance with a primary discontinuous reception, DRX, operation, the communications device comprising
   a receiver configured to receive signals via a wireless access interface provided by the wireless communications network, and
   a controller configured in combination with the receiver
     to monitor for signals transmitted by the infrastructure equipment to the communications device during the primary active operating mode,
     to reduce an operating power of the receiver during the primary reduced power operating mode,
     to determine that the communications device should switch from the primary DRX operation to operate in accordance with a short DRX operation in which the communications device is configured to switch at least at a second periodic rate between a secondary active operating mode and a secondary reduced power operating mode, and
     to start, subsequent to determining that the communications device should operate in accordance with the short DRX operation, a short DRX duration timer specifying a short DRX period during which the communications device operates in accordance with the short DRX operation before switching back to the primary DRX operation,
     wherein at least one parameter of the short DRX operation is different to the at least one parameter of the primary DRX operation.

Paragraph 36. A communications device according to Paragraph 35, wherein the at least one parameter of the short DRX operation is a time duration of each instance of the secondary active operating mode and the at least one parameter of the primary DRX operation is a time duration of each instance of the primary active operating mode.

Paragraph 37. A communications device according to Paragraph 35 or Paragraph 36, wherein the at least one parameter of the short DRX operation is an inactivity timer started during the short DRX operation and defining a period during which the communications device remains in the secondary active operating mode following the short DRX operation and the at least one parameter of the primary DRX operation is an inactivity timer started during the primary DRX operation and defining a period during which the communications device remains in the primary active operating mode following the primary DRX operation.

Paragraph 38. A communications device according to any of Paragraphs 35 to 37, wherein the communications device determines that the communications device should switch from the primary DRX operation to operate in accordance with the short DRX operation upon detection of a downlink transmission from the infrastructure equipment to the communications device.

Paragraph 39. A communications device according to any of Paragraphs 35 to 38, wherein the communications device determines that the communications device should switch from the primary DRX operation to operate in accordance with the short DRX operation upon detection that an inactivity period defined by an inactivity timer started by the communications device during the primary DRX operation has elapsed.

Paragraph 40 A communications device according to any of Paragraphs 35 to 39, wherein the short DRX operation comprises a plurality of phases, each of the phases having a different value of at least one short DRX parameter.

Paragraph 41. A communications device according to Paragraph 40, wherein the at least one short DRX parameter comprises a proportion of the short DRX operation during which the communications device is in the secondary active operating mode.

Paragraph 42. A communications device according to Paragraph 40 or Paragraph 41, wherein the at least one short DRX parameter comprises a time duration that the communications device is in each instance of the secondary active operating mode during the short DRX operation.

Paragraph 43 A communications device according to any of Paragraphs 40 to 42, wherein the at least one short DRX parameter comprises a periodic rate of switching of the communications device between the secondary active operating mode and the secondary reduced power operating mode.

Paragraph 44. A communications device according to any of Paragraphs 40 to 43, wherein the at least one short DRX parameter comprises a number of instances of the secondary active operating mode.

Paragraph 45. A communications device according to any of Paragraphs 40 to 44, wherein there is a time gap between two of the plurality of phases of the short DRX operation during which the communications device is in the secondary reduced power operating mode.

Paragraph 46. A communications device according to any of Paragraphs 40 to 45, wherein the communications device is configured
to determine if a downlink transmission from the infrastructure equipment to the communications device is detected, and
if a downlink transmission from the infrastructure equipment to the communications device is detected, to restart the short DRX duration timer and to restart the short DRX operation beginning with the first phase.

Paragraph 47. A communications device according to any of Paragraphs 40 to 46, wherein the communications device is configured
to determine if a downlink transmission from the infrastructure equipment to the communications device is detected, and
if a downlink transmission from the infrastructure equipment to the communications device is detected, to restart the short DRX duration timer and to operate in accordance with the first phase for the duration of the restarted short DRX period.

Paragraph 48. A communications device according to any of Paragraphs 40 to 47, wherein the communications device is configured
to determine if a first downlink transmission from the infrastructure equipment to the communications device is detected,
to determine if a second downlink transmission from the infrastructure equipment to the communications device is detected, and
if a second downlink transmission from the infrastructure equipment to the communications device is detected, to determine whether the time between detecting the first downlink transmission and detecting the second downlink transmission is less than a predetermined threshold time, wherein
if the time between detecting the first downlink transmission and detecting the second downlink transmission is less than the predetermined threshold time, the communications device is configured to restart the short DRX duration timer and to restart the short DRX operation beginning with the first phase, and wherein
if the time between detecting the first downlink transmission and detecting the second downlink transmission is greater than the predetermined threshold time, the communications device is configured to restart the short DRX duration timer and to operate in accordance with the current phase during which the second downlink transmission is detected.

Paragraph 49. A communications device according to any of Paragraphs 40 to 48, wherein the communications device is configured
to determine if a downlink transmission from the infrastructure equipment to the communications device is detected,
wherein at least one of the number of phases of the short DRX operation and the value of the short DRX parameter of each of the phases of the short DRX operation is dependent on a type of data traffic of the downlink transmission.

Paragraph 50. A communications device according to Paragraph 49, wherein at least one of the number of phases of the short DRX operation and the value of the short DRX parameter of each of the phases of the short DRX operation is dependent on a relative priority level of the type of data traffic of the downlink transmission.

Paragraph 51. A communications device according to any of Paragraphs 40 to 50, wherein the communications device is configured
to determine if a downlink transmission from the infrastructure equipment to the communications device is detected, and
to attempt to decode the downlink transmission,
wherein at least one of the number of phases of the short DRX operation and the value of the short DRX parameter of each of the phases of the short DRX operation is dependent on whether the downlink transmission has been successfully decoded by the communications device.

Paragraph 52. A communications device according to any of Paragraphs 40 to 51, wherein instances of the secondary active operating mode of one or more of the phases of the short DRX operation are preceded by a wake-up signal, WUS, monitoring period, and the communications device is configured
to determine, for each of the WUS monitoring periods, whether a WUS is received from the infrastructure equipment, wherein
if a WUS is received during the WUS monitoring period, to switch into the secondary active operating mode for the instance of the secondary active operating mode preceded by the WUS monitoring period, and wherein
if a WUS is not received during the WUS monitoring period, to switch into the secondary reduced power mode for the instance of the secondary active operating mode preceded by the WUS monitoring period.

Paragraph 53. A communications device according to Paragraph 52, wherein, for each of the WUS monitoring periods, if a WUS is received during the WUS monitoring period, the communications device is configured to restart the short DRX duration timer and to restart the short DRX operation beginning with the first phase.

Paragraph 54. A communications device according to any of Paragraphs 40 to 53, wherein instances of the secondary active operating mode of one or more of the phases of the short DRX operation are preceded by a go-to-sleep signal, GTS, monitoring period, and the communications device is configured
to determine, for each of the GTS monitoring periods, whether a GTS is received from the infrastructure equipment, wherein
if a GTS is not received during the GTS monitoring period, to switch into the secondary active operating mode for the instance of the secondary active operating mode preceded by the GTS monitoring period, and wherein if a GTS is received during the GTS monitoring period, to switch into the secondary reduced power mode for the instance of the secondary active operating mode preceded by the GTS monitoring period.

Paragraph 55. A communications device according to Paragraph 54, wherein, for each of the GTS monitoring periods, if a GTS is not received during the GTS monitoring period, the communications device is configured to restart the short DRX duration timer and to restart the short DRX operation beginning with the first phase.

Paragraph 56. A communications device according to any of Paragraphs 40 to 55, wherein one or both of the number of phases of the short DRX operation and the at least one short DRX parameter for each of the phases of the short DRX operation are indicated to the communications device by a short DRX period indication signal received from the infrastructure equipment.

Paragraph 57. A communications device according to Paragraph 56, wherein the short DRX period indication signal is carried by a WUS.

Paragraph 58. A communications device according to any of Paragraphs 40 to 57, wherein one or both of the number of phases of the short DRX operation and the at least one short DRX parameter for each of the phases of the short DRX operation are indicated to the communications device via Radio Resource Control, RRC, signalling received from the infrastructure equipment.

Paragraph 59. A communications device according to any of Paragraphs 40 to 58, wherein one or both of the number of phases of the short DRX operation and the at least one short DRX parameter for each of the phases of the short DRX operation are indicated to the communications device in a Downlink Control Indication, DCI, message received from the infrastructure equipment.

Paragraph 60. A communications device according to any of Paragraphs 35 to 59, wherein the communications device is configured
  to determine whether a downlink transmission is received in accordance with a pre-emption operation or whether an uplink transmission from the communications device to the infrastructure equipment is transmitted in accordance with the pre-emption operation, the pre-emption operation being an operation in which resources of the wireless access interface allocated to another communications device are used for the transmission by the communication device, wherein
  if either of the downlink transmission or uplink transmission are in accordance with the pre-emption operation, to operate in accordance with a first configuration of the short DRX operation, and wherein
  if neither of the downlink transmission or uplink transmission are in accordance with the pre-emption operation, to operate in accordance with a second configuration of the short DRX operation,
  wherein a proportion of the short DRX operation during which the communications device is in the secondary active operating mode is greater for the first configuration of the short DRX operation than for the second configuration of the short DRX operation.

Paragraph 61. A method of operating a communications device configured to receive signals from an infrastructure equipment of a wireless communications network, the communications device being configured to periodically switch, in accordance with a first periodic rate, between a primary active operating mode and a primary reduced power operating mode in accordance with a primary discontinuous reception, DRX, operation, the method comprising
  monitoring for signals transmitted by the infrastructure equipment via a wireless access interface provided by the wireless communications network to the communications device during the primary active operating mode,
  reducing an operating power of the receiver during the primary reduced power operating mode,
  determining that the communications device should switch from the primary DRX operation to operate in accordance with a short DRX operation in which the communications device is configured to switch at least at a second periodic rate between a secondary active operating mode and a secondary reduced power operating mode, and
  starting, subsequent to determining that the communications device should operate in accordance with the short DRX operation, a short DRX duration timer specifying a short DRX period during which the communications device operates in accordance with the short DRX operation before switching back to the primary DRX operation,
  wherein at least one parameter of the short DRX operation is different to the at least one parameter of the primary DRX operation.

Paragraph 62. Circuitry for a communications device configured to receive signals from an infrastructure equipment of a wireless communications network, the communications device being configured to periodically switch, in accordance with a first periodic rate, between a primary active operating mode and a primary reduced power operating mode in accordance with a primary discontinuous reception, DRX, operation, the communications device comprising
  receiver circuitry configured to receive signals via a wireless access interface provided by the wireless communications network, and
  controller circuitry configured in combination with the receiver circuitry
  to monitor for signals transmitted by the infrastructure equipment to the communications device during the primary active operating mode,
  to reduce an operating power of the receiver during the primary reduced power operating mode,
  to determine that the communications device should switch from the primary DRX operation to operate in accordance with a short DRX operation in which the communications device is configured to switch at least at a second periodic rate between a secondary active operating mode and a secondary reduced power operating mode, and
  to start, subsequent to determining that the communications device should operate in accordance with the short DRX operation, a short DRX duration timer specifying a short DRX period during which the communications device operates in accordance with the short DRX operation before switching back to the primary DRX operation,
  wherein at least one parameter of the short DRX operation is different to the at least one parameter of the primary DRX operation.

Paragraph 63. An infrastructure equipment forming part of a wireless communications network configured to transmit signals to a communications device, the communications device periodically switching, in accordance with a first periodic rate, between a primary active operating mode and a primary reduced power operating mode in accordance with a primary discontinuous reception, DRX, operation, the infrastructure equipment comprising
 a transceiver configured to transmit signals and receive signals via a wireless access interface provided by the wireless communications network, and
 a controller configured to control the transceiver
 to transmit, to the communications device, an indication of a number of phases of a short DRX operation, in which the communications device is configured to switch at least at a second periodic rate between a secondary active operating mode and a secondary reduced power operating mode, and at least one short DRX parameter for each of the phases of the short DRX operation,
 wherein at least one parameter of the short DRX operation is different to the at least one parameter of the primary DRX operation.

Paragraph 64. A method of operating an infrastructure equipment forming part of a wireless communications network configured to transmit signals to a communications device, the communications device periodically switching, in accordance with a first periodic rate, between a primary active operating mode and a primary reduced power operating mode in accordance with a primary discontinuous reception, DRX, operation, the method comprising
 transmitting, to the communications device via a wireless access interface provided by the wireless communications network, an indication of a number of phases of a short DRX operation, in which the communications device is configured to switch at least at a second periodic rate between a secondary active operating mode and a secondary reduced power operating mode, and at least one short DRX parameter for each of the phases of the short DRX operation,
 wherein at least one parameter of the short DRX operation is different to the at least one parameter of the primary DRX operation.

Paragraph 65. Circuitry for an infrastructure equipment forming part of a wireless communications network configured to transmit signals a communications device, the communications device periodically switching, in accordance with a first periodic rate, between a primary active operating mode and a primary reduced power operating mode in accordance with a primary discontinuous reception, DRX, operation, the infrastructure equipment comprising
 transceiver circuitry configured to transmit signals and receive signals via a wireless access interface provided by the wireless communications network, and
 controller circuitry configured to control the transceiver circuitry
 to transmit, to the communications device, an indication of a number of phases of a short DRX operation, in which the communications device is configured to switch at least at a second periodic rate between a secondary active operating mode and a secondary reduced power operating mode, and at least one short DRX parameter for each of the phases of the short DRX operation,
 wherein at least one parameter of the short DRX operation is different to the at least one parameter of the primary DRX operation.

Paragraph 66. A communications device configured to receive signals from an infrastructure equipment of a wireless communications network, the communications device operating in accordance with an active connected mode, the communications device comprising
 a receiver configured to receive signals via a wireless access interface provided by the wireless communications network, and
 a controller configured in combination with the receiver
 to monitor for signals transmitted by the infrastructure equipment to the communications device while the communications device is operating in accordance with the active connected mode,
 to determine that the communications device should switch from the active connected mode to operate in accordance with a short DRX operation in which the communications device is configured to switch at least at a second periodic rate between a secondary active operating mode and a secondary reduced power operating mode,
 to start, subsequent to determining that the communications device should operate in accordance with the short DRX operation, a short DRX duration timer specifying a short DRX period during which the communications device operates in accordance with the short DRX operation before switching to a legacy discontinuous reception, DRX, operation, where the communications device periodically switches, in accordance with a first periodic rate, between a primary active operating mode and a primary reduced power operating mode,
 wherein at least one parameter of the short DRX operation is different to the at least one parameter of the legacy DRX operation.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.

[2] RP-172834, "Revised WID on New Radio Access Technology," NTT DOCOMO, RAN #78.
[3] European Patent Applicant No. EP17169577.8.
[4] European Patent Applicant No. EP17186065.3.
[5] European Patent Applicant No. EP17186062.0.
[6] European Patent Applicant No. EP17201751.9.
[7] R1-1708311, "Idle Mode Power Efficiency Reduction," Sierra Wireless, RAN1 #89.
[8] TR 38.840, "NR: Study on UE Power Saving (Release 16, v0.1.0)", 3GPP, November 2018.
[9] TS 38.321, "NR: Medium Access Control (MAC) Protocol Specification (Release 15, v15.4.0)", 3GPP, January 2019.

What is claimed is:

1. A communications device configured to receive signals from an infrastructure equipment of a wireless communications network, the communications device being configured to switch at a first periodic rate between a primary active operating mode and a primary reduced power operating mode in accordance with a primary discontinuous reception, DRX, operation, the communications device comprising:
  a receiver configured to receive signals via a wireless access interface provided by the wireless communications network, and
  a controller configured, in combination with the receiver, to:
    monitor for signals transmitted by the infrastructure equipment to the communications device during the primary active operating mode,
    reduce an operating power of the receiver during the primary reduced power operating mode by reducing a duration of the DRX ON periods in a plurality of phases of successively shorter durations of the DRX ON periods in the primary reduced power operating mode, and
    to start, during an instance of the primary active operating mode upon detection of a first downlink transmission from the infrastructure equipment to the communications device, an inactivity timer specifying an inactivity period during which the communications device does not switch into the primary reduced power operating mode,
    wherein the communications device is configured, during the inactivity period, to operate in a power consumption optimized mode.

2. The communications device according to claim 1, wherein the communications device is configured, in the power consumption optimized mode, to switch at least at a second periodic rate, between a secondary active operating mode and a secondary reduced power operating mode in accordance with a secondary DRX operation during the inactivity period, the second periodic rate being higher than the first periodic rate.

3. The communications device according to claim 1, wherein the communications device is configured, in the power consumption optimized mode, to operate with a reduced bandwidth compared to a bandwidth with which the communications device operates when not in the power consumption optimized mode.

4. The communications device according to claim 1, wherein the communications device is configured, in the power consumption optimized mode, to monitor fewer beams compared to a number of beams that the communications device is configured to monitor when not in the power consumption optimized mode.

5. The communications device according to claim 1, wherein the communications device is configured, in the power consumption optimized mode, to monitor fewer transmit antenna ports compared to a number of transmit antenna ports that the communications device is configured to monitor when not in the power consumption optimized mode.

6. The communications device according to claim 1, wherein the communications device is configured, in the power consumption optimized mode, to perform cross-slot scheduling.

7. The communications device according to claim 2, wherein the communications device is configured to remain in the primary active operating mode after starting the inactivity timer until the end of the instance of the primary active operating mode in which the inactivity timer was started.

8. The communications device according to claim 1, wherein the power consumption optimized mode comprises a plurality of phases, each of the phases having a different value of at least one parameter.

9. The communications device according to claim 2, wherein each of the plurality of phases has a different value of at least one DRX parameter.

10. The communications device according to claim 9, wherein the at least one DRX parameter comprises an indication of a portion, in time, of the secondary DRX operation during which the communications device is in the secondary active operating mode.

11. The communications device according to claim 9, wherein the at least one DRX parameter comprises a time duration that the communications device is in each instance of the second active operating mode during the secondary DRX operation.

12. The communications device according to claim 9, wherein there is a time gap between two of the plurality of phases of the secondary DRX operation during which the communications device is in the secondary reduced power operating mode.

13. The communications device according to claim 9, wherein the portion of the secondary DRX operation during which the communications device is in the secondary active operating mode is largest, in time, in a first of the plurality of phases and decreases over time such that the proportion of the secondary DRX operation during which the communications device is in the secondary active operating mode is smallest, in time, in a last of the plurality of phases.

14. The communications device according to claim 9, wherein the communications device is configured
  to determine if a second downlink transmission from the infrastructure equipment to the communications device is detected, and
  if a second downlink transmission from the infrastructure equipment to the communications device is detected, to restart the inactivity timer and to restart the secondary DRX operation beginning with the first phase.

15. The communications device according to claim 9, wherein the communications device is configured
  to determine if a second downlink transmission from the infrastructure equipment to the communications device is detected, and
  if a second downlink transmission from the infrastructure equipment to the communications device is detected, to restart the inactivity timer and to operate in accordance with the first phase for the duration of the restarted inactivity period.

16. The communications device according to claim 9, wherein the communications device is configured
- to determine if a second downlink transmission from the infrastructure equipment to the communications device is detected, and
- if a second downlink transmission from the infrastructure equipment to the communications device is detected, to determine whether the time between detecting the first downlink transmission and detecting the second downlink transmission is less than a predetermined threshold time, wherein
- if the time between detecting the first downlink transmission and detecting the second downlink transmission is less than the predetermined threshold time, the communications device is configured to restart the inactivity timer and to restart the secondary DRX operation beginning with the first phase, and wherein
- if the time between detecting the first downlink transmission and detecting the second downlink transmission is greater than the predetermined threshold time, the communications device is configured to restart the inactivity timer and to operate in accordance with the current phase during which the second transmission is detected.

17. The communications device according to claim 9, wherein at least one of the number of phases of the DRX operation and the value of the DRX parameter of each of the phases of the DRX operation is dependent on a type of data traffic of the first downlink transmission.

18. The communications device according to claim 9, wherein at least one of the number of phases of the DRX operation and the value of the DRX parameter of each of the phases of the DRX operation is dependent on whether or not the first downlink transmission has been successfully decoded by the communications device.

19. A method of operating a communications device configured to receive signals from an infrastructure equipment of a wireless communications network, the communications device being configured to periodically switch, in accordance with a first periodic rate, between a primary active operating mode and a primary reduced power operating mode in accordance with a primary discontinuous reception, DRX, operation, the method comprising:
- monitoring for signals transmitted by the infrastructure equipment to the communications device via a wireless access interface provided by the wireless communications network during the primary active operating mode,
- reducing an operating power of the receiver during the primary reduced power operating mode by reducing a duration of the DRX ON periods in a plurality of phases of successively shorter durations of the DRX ON periods in the primary reduced power operating mode, and
- starting, during an instance of the primary active operating mode upon detection of a first downlink transmission from the infrastructure equipment to the communications device, an inactivity timer specifying an inactivity period during which the communications device does not switch into the primary reduced power operating mode,
- wherein the communications device operates, during the inactivity period, in a power consumption optimized mode.

* * * * *